US012694583B2

(12) United States Patent
Peng et al.

(10) Patent No.: US 12,694,583 B2
(45) Date of Patent: Jul. 28, 2026

(54) IMAGE PROCESSING METHOD BASED ON DITHER ALGORITHM AND DISPLAY DEVICE

(71) Applicant: BOE Technology Group Co., Ltd., Beijing (CN)

(72) Inventors: Xiangjun Peng, Beijing (CN); Tiankuo Shi, Beijing (CN); Minglei Chu, Beijing (CN); Yifan Hou, Beijing (CN); Yan Sun, Beijing (CN); Yaofeng Li, Beijing (CN); Rui Liu, Beijing (CN); Xin Duan, Beijing (CN); Wei Sun, Beijing (CN); Xiao Chu, Beijing (CN); Hui Li, Beijing (CN); Shuo Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 149 days.

(21) Appl. No.: 18/658,866

(22) Filed: May 8, 2024

(65) Prior Publication Data

US 2024/0290010 A1 Aug. 29, 2024

Related U.S. Application Data

(63) Continuation of application No. PCT/CN2022/127903, filed on Oct. 27, 2022.

(51) Int. Cl.
G06T 11/10 (2026.01)
G06F 3/01 (2006.01)
G06T 7/13 (2017.01)

(52) U.S. Cl.
CPC .............. G06T 11/10 (2026.01); G06F 3/013 (2013.01); G06T 7/13 (2017.01); G06T 2207/10024 (2013.01); G06T 2207/20021 (2013.01)

(58) Field of Classification Search
CPC ......... G06T 11/001; G06T 11/00; G06T 7/13; G06T 2207/10024; G06T 2207/20021;
(Continued)

(56) References Cited

U.S. PATENT DOCUMENTS

| | | | | |
|---|---|---|---|---|
| 4,631,521 A | * | 12/1986 | El-Sherbini | .......... H04N 1/4105 382/245 |
| 5,822,451 A | * | 10/1998 | Spaulding | ................ H04N 1/52 382/270 |

(Continued)

FOREIGN PATENT DOCUMENTS

| | | |
|---|---|---|
| CN | 107807732 A | 3/2018 |
| CN | 110799928 A | 2/2020 |

(Continued)

OTHER PUBLICATIONS

Ho Chris Foveal adaptation of temporal anti-aliasing Feb. 14, 2020 Sony Interactive Entertainment Inc CN110799928 (A) para. 1-84 English.*

(Continued)

*Primary Examiner* — Prabodh M Dharia
(74) *Attorney, Agent, or Firm* — IPro, PLLC

(57) ABSTRACT

An image processing method based on a dither algorithm and a display device are disclosed. The method includes: obtaining a to-be-displayed image, and determining a first region and a second region of the to-be-displayed image, where the first region and the second region are determined according to a coverage range of a visual field of a user on a display screen; determining a first dither algorithm corresponding to the first region and a second dither algorithm corresponding to the second region, where parameter matrices the first dither algorithm and the second dither algorithm are different; and obtaining a rendered image of the to-be-displayed image by rendering the first region according to the first dither algorithm and rendering the second region
(Continued)

according to the second dither algorithm, and displaying the rendered image on the display screen.

18 Claims, 10 Drawing Sheets

(58) Field of Classification Search
CPC ................ G06F 3/013; G02B 27/0093; G09G 2320/0686; G09G 3/2051; G09G 2340/0407; G09G 2354/00
USPC ................. 345/565, 589, 596, 597; 358/1.9; 382/245, 270
See application file for complete search history.

(56) References Cited

U.S. PATENT DOCUMENTS

| | | | | | |
|---|---|---|---|---|---|
| 6,052,113 | A | * | 4/2000 | Foster ....................... | H04N 1/52 |
| | | | | | 345/596 |
| 7,978,200 | B1 | * | 7/2011 | Small ................... | G09G 3/2044 |
| | | | | | 345/565 |
| 11,315,327 | B1 | * | 4/2022 | Seiler ....................... | G06T 7/207 |

| | | | | | |
|---|---|---|---|---|---|
| 2007/0236743 | A1 | * | 10/2007 | Stanich ................ | H04N 1/4051 |
| | | | | | 358/1.9 |
| 2013/0002703 | A1 | * | 1/2013 | Tripathi ............... | G09G 3/2051 |
| | | | | | 345/596 |
| 2016/0080607 | A1 | * | 3/2016 | Horita .................... | H04N 1/603 |
| | | | | | 358/1.9 |
| 2019/0035049 | A1 | | 1/2019 | Backer et al. | |
| 2021/0255461 | A1 | | 8/2021 | Watanabe et al. | |
| 2023/0282148 | A1 | * | 9/2023 | Demeuse ............ | H04N 1/4052 |
| | | | | | 345/589 |

FOREIGN PATENT DOCUMENTS

| | | | |
|---|---|---|---|
| CN | 111902803 | A | 11/2020 |
| CN | 113542710 | B | 2/2022 |
| CN | 114127835 | A | 3/2022 |

OTHER PUBLICATIONS

Ho Chris Foveal adaptation of temporal anti-aliasing Feb. 14, 2020 Sony Interactive Entertainment Inc CN110799928 (A) para. 1-84 Chinese.*

* cited by examiner

Figure 3:
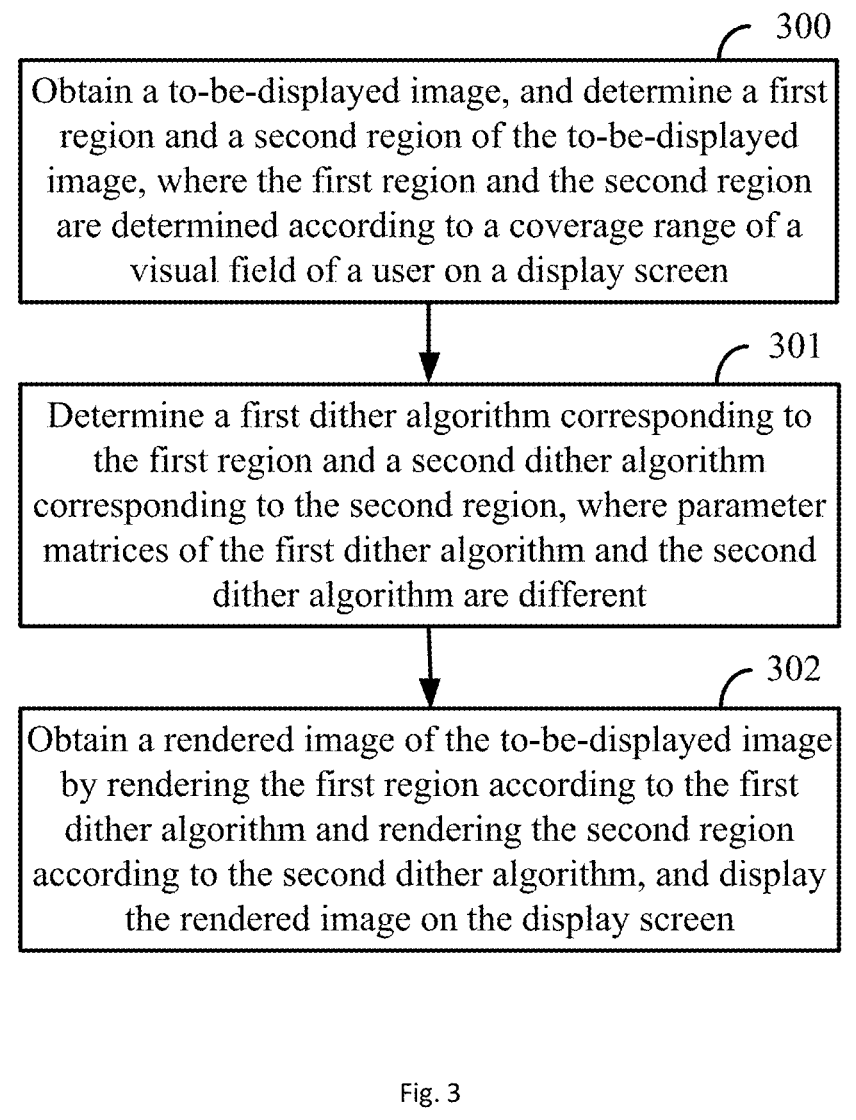

300

Obtain a to-be-displayed image, and determine a first region and a second region of the to-be-displayed image, where the first region and the second region are determined according to a coverage range of a visual field of a user on a display screen

301

Determine a first dither algorithm corresponding to the first region and a second dither algorithm corresponding to the second region, where parameter matrices of the first dither algorithm and the second dither algorithm are different

302

Obtain a rendered image of the to-be-displayed image by rendering the first region according to the first dither algorithm and rendering the second region according to the second dither algorithm, and display the rendered image on the display screen

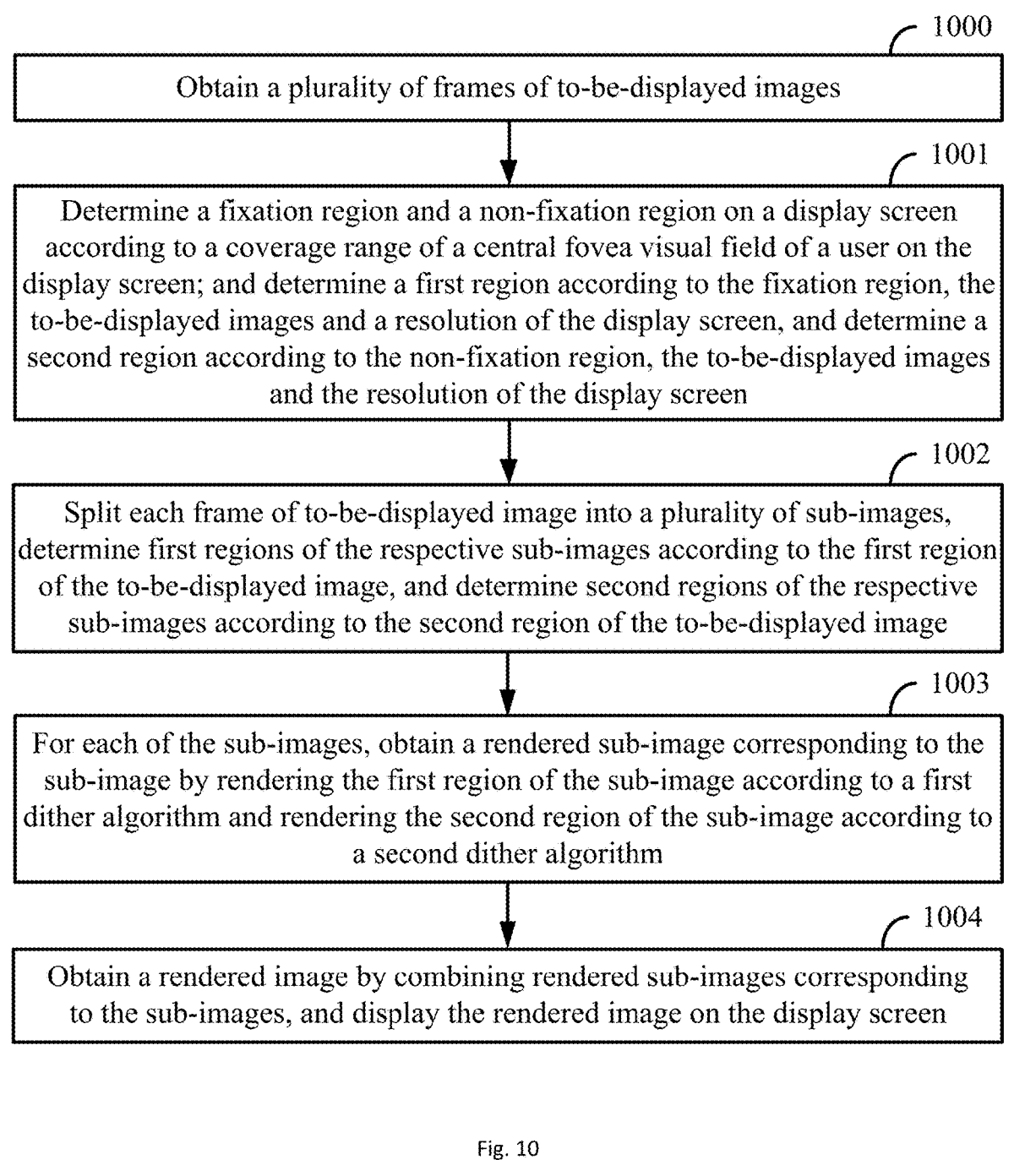

1000
Obtain a plurality of frames of to-be-displayed images

1001
Determine a fixation region and a non-fixation region on a display screen according to a coverage range of a central fovea visual field of a user on the display screen; and determine a first region according to the fixation region, the to-be-displayed images and a resolution of the display screen, and determine a second region according to the non-fixation region, the to-be-displayed images and the resolution of the display screen 1002
Split each frame of to-be-displayed image into a plurality of sub-images, determine first regions of the respective sub-images according to the first region of the to-be-displayed image, and determine second regions of the respective sub-images according to the second region of the to-be-displayed image 1003
For each of the sub-images, obtain a rendered sub-image corresponding to the sub-image by rendering the first region of the sub-image according to a first dither algorithm and rendering the second region of the sub-image according to a second dither algorithm 1004
Obtain a rendered image by combining rendered sub-images corresponding to the sub-images, and display the rendered image on the display screen

Fig. 10

IMAGE PROCESSING METHOD BASED ON DITHER ALGORITHM AND DISPLAY DEVICE

CROSS REFERENCE TO RELATED APPLICATION

This application is a continuation application of International Application No. PCT/CN2022/127903, filed on Oct. 27, 2022, which is hereby incorporated by reference in its entirety.

TECHNICAL FIELD

The present disclosure relates to the technical field of image processing, and in particular to an image processing method based on a dither algorithm and a display device.

BACKGROUND

An intelligent screen split technology is that, with reference to the principle of human eye imaging, only a very small range of a central fovea visual field is rendered in an image rendering process, and fuzzy rendering is performed on a surrounding visual field region. When an eyeball rotates, a fixation region in a screen changes with the change of a fixation point, high-definition rendering is performed by one-to-one mapping of pixels in the fixation region of the image with pixels on the screen, and fuzzy rendering is performed by one-to-many mapping of pixels in the non-fixation region of the image with the pixels on the screen.

A dither algorithm is a commonly used algorithm in image quality display, with a function of improving the accuracy of color display. The dither algorithm simulates a larger quantity of colors of a to-be-displayed image by using a smaller quantity of colors that a display device can display. In an intelligent screen split application, if the same dither scheme is used for both the non-fixation region and the fixation region, the non-fixation region processed by the dither algorithm may exhibit the problems of unsmooth gray scale transition and interframe flicker in a displayed image.

SUMMARY

The present disclosure provides an image processing method based on a dither algorithm and a display device, for achieving full-screen smooth transition under screen split and improving the gray scale display accuracy by adopting different dither algorithms for different regions.

In a first aspect, an image processing method based on a dither algorithm according to an embodiment of the present disclosure includes:

obtaining a to-be-displayed image, and determining a first region and a second region of the to-be-displayed image, where the first region and the second region are determined according to a coverage range of a visual field of a user on a display screen;

determining a first dither algorithm corresponding to the first region and a second dither algorithm corresponding to the second region, where parameter matrices of the first dither algorithm and the second dither algorithm are different; and obtaining a rendered image of the to-be-displayed image by rendering the first region according to the first dither algorithm and rendering the second region according to the second dither algorithm, and displaying the rendered image on the display screen.

As an optional implementation, the determining the first region and the second region of the to-be-displayed image includes:

determining a fixation region and a non-fixation region on the display screen according to a coverage range of a central fovea visual field of the user on the display screen;

determining the first region according to the fixation region, the to-be-displayed image and a resolution of the display screen, where one pixel of the first region corresponds to one pixel of the fixation region; and determining the second region according to the non-fixation region, the to-be-displayed image and the resolution of the display screen, where one pixel of the second region corresponds to a plurality of pixels of the non-fixation region.

As an optional implementation, the first dither algorithm includes a plurality of first parameter matrices; the plurality of first parameter matrices are used for processing different pixel values in the first region of the to-be-displayed image; and target parameters in the first parameter matrices are distributed symmetrically.

As an optional implementation, in a case that a plurality of frames of to-be-displayed images are obtained in a preset cycle, in adjacent frames of to-be-displayed images, the target parameters in the first parameter matrices corresponding to pixel values at a same pixel position are same in quantity and different in position;

where the preset cycle is determined according to a quantity of frames of successively-obtained to-be-displayed images.

As an optional implementation, the target parameters in the first parameter matrices are 1, and the target parameters are distributed symmetrically along diagonals of the first parameter matrices.

As an optional implementation, a quantity of the target parameters in the first parameter matrices is determined according to preset bits of the pixel values in the to-be-displayed image, and different preset bits correspond to different quantities of target parameters; and the preset bits are determined according to a difference between a total quantity of bits of the pixel values of the to-be-displayed images and a total quantity of bits of pixel values that the display screen is able to display.

As an optional implementation, when the preset bits are last two bits of the pixel values in the to-be-displayed image and the target parameters are 1, the quantity of the target parameters in the first parameter matrices is determined as follows:

in a case that the preset bits are 00, the quantity of the target parameters in the first parameter matrices is 0;

in a case that the preset bits are 01, the quantities of the target parameters in each row and each column of the first parameter matrices are both 1;

in a case that the preset bits are 10, the quantities of the target parameters in each row and each column of the first parameter matrices are both 2; and in a case that the preset bits are 11, the quantities of the target parameters in each row and each column of the first parameter matrices are both 3.

As an optional implementation, the first parameter matrix includes a plurality of first sub-matrices, and the first parameter matrix is obtained by rotating one of the first sub-matrices anticlockwise or clockwise.

As an optional implementation, in a case that a plurality of frames of to-be-displayed images are obtained in a preset cycle, in the pixel values of adjacent frames of to-be-displayed images, ones of the first sub-matrices in the first parameter matrices corresponding to same preset bits are different; and the preset bits are determined according to a difference between a total quantity of bits of the pixel values of the to-be-displayed images and a total quantity of bits of pixel values that the display screen is able to display.

As an optional implementation, distribution of the plurality of first sub-matrices of the first parameter matrix is determined according to preset bits of the pixel values in the to-be-displayed image, and positional relationships determined by different preset bits are different.

As an optional implementation, when the preset bits are last two bits of the pixel values in the to-be-displayed image, the distribution of the plurality of first sub-matrices of the first parameter matrix is determined as follows:

in a case that the preset bits are 01, the first sub-matrix located at an upper left corner of the first parameter matrix is fixed, and other first sub-matrices are obtained by rotating the first sub-matrix at the upper left corner anticlockwise or clockwise;

in a case that the preset bits are 10, the first sub-matrices on diagonals of the first parameter matrix are distributed symmetrically; and in a case that the preset bits are 11, the first sub-matrices on the diagonals of the first parameter matrix are same.

As an optional implementation, the first dither algorithm includes a set of first parameter matrices, the set of first parameter matrices includes a plurality of first parameter matrix groups, and each of the first parameter matrix groups includes a plurality of first parameter matrices;

where the set of first parameter matrices corresponds to a plurality of frames of to-be-displayed images obtained in a preset cycle, and each of the first parameter matrix groups corresponds to one frame of to-be-displayed image obtained.

As an optional implementation, the second dither algorithm includes a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

As an optional implementation, the target parameters in the second parameter matrices are distributed symmetrically.

As an optional implementation, when last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix; where the first candidate parameter matrix is a first parameter matrix corresponding to a pixel value with the last two bits being 01 in the first region, among a plurality of first parameter matrices in the first dither algorithm; or, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix; where the second candidate parameter matrix is a first parameter matrix corresponding to a pixel value with the last two bits being 10 in the first region, among the plurality of first parameter matrices in the first dither algorithm.

As an optional implementation, when last two bits of the pixel values in the second region of the to-be-displayed image are 11, the second parameter matrix is same as a third candidate parameter matrix;

where the third candidate parameter matrix is a first parameter matrix corresponding to a pixel value with the last two bits being 11 in the first region, among a plurality of first parameter matrices in the first dither algorithm.

As an optional implementation, in a case that a plurality of frames of to-be-displayed images are obtained in a preset cycle, in the pixel values of adjacent frames of to-be-displayed images, same preset bits correspond to a same second parameter matrix.

As an optional implementation, a size of the second parameter matrices is determined according to a size of first parameter matrices; or, the size of the second parameter matrices is determined according to a correspondence relationship between pixels of the to-be-displayed image and pixels of a non-fixation region of the display screen.

As an optional implementation, the second dither algorithm includes a set of second parameter matrices, the set of second parameter matrices includes a plurality of second parameter matrix groups, and each of the second parameter matrix groups includes a plurality of second parameter matrices;

where the set of second parameter matrices corresponds to a plurality of frames of to-be-displayed images obtained in a preset cycle, and each of the second parameter matrix groups corresponds to one frame of to-be-displayed image obtained.

As an optional implementation, the obtaining the rendered image of the to-be-displayed image by rendering the first region according to the first dither algorithm and rendering the second region according to the second dither algorithm includes:

splitting the to-be-displayed image into a plurality of sub-images, each of the sub-images being a single-channel image;

determining first regions of the respective sub-images according to the first region of the to-be-displayed image, and determining second regions of the respective sub-images according to the second region of the to-be-displayed image;

for each of the sub-images, obtaining a rendered sub-image corresponding to the sub-image by rendering the first region of the sub-image according to the first dither algorithm and rendering the second region of the sub-image according to the second dither algorithm; and obtaining the rendered image by combining rendered sub-images corresponding to the sub-images.

As an optional implementation, the first dither algorithm includes first parameter matrices, and the second dither algorithm includes second parameter matrices; and the rendering the first region according to the first dither algorithm and rendering the second region according to the second dither algorithm includes:

determining the first parameter matrices for traversing the first region according to pixel values of pixels of the first region; and rendering the pixel values in the first region according to parameters corresponding to pixel positions of the pixels and the pixel values of the pixels in the first parameter matrices during traversing; or, determining the second parameter matrices for traversing the second region according to pixel values of pixels of the second region; and rendering the pixel values in the second region according to parameters corresponding to pixel positions of the pixels and the pixel values of the pixels in the second parameter matrices during traversing.

In a second aspect, a display device according to an embodiment of the present disclosure includes a display screen and a processor, where:

the display screen is configured to display contents; and the processor is configured to perform following steps:

obtaining a to-be-displayed image, and determining a first region and a second region of the to-be-displayed image, where the first region and the second region are determined according to a coverage range of a visual field of a user on the display screen;

determining a first dither algorithm corresponding to the first region and a second dither algorithm corresponding to the second region, where the first dither algorithm and the second dither algorithm are different in parameter matrix; and obtaining a rendered image of the to-be-displayed image by rendering the first region according to the first dither algorithm and rendering the second region according to the second dither algorithm, and displaying the rendered image on the display screen.

As an optional implementation, the processor is configured to perform:

determining a fixation region and a non-fixation region on the display screen according to a coverage range of a central fovea visual field of the user on the display screen;

determining the first region according to the fixation region, the to-be-displayed image and a resolution of the display screen, where one pixel of the first region corresponds to one pixel of the fixation region; and determining the second region according to the non-fixation region, the to-be-displayed image and the resolution of the display screen, where one pixel of the second region corresponds to a plurality of pixels of the non-fixation region.

As an optional implementation, the first dither algorithm includes a plurality of first parameter matrices; the plurality of first parameter matrices are used for processing different pixel values in the first region of the to-be-displayed image; and target parameters in the first parameter matrices are distributed symmetrically.

As an optional implementation, in a case that a plurality of frames of to-be-displayed images are obtained in a preset cycle, in adjacent frames of to-be-displayed images, the target parameters in the first parameter matrices corresponding to pixel values at a same pixel position are same in quantity and different in position;

where the preset cycle is determined according to a quantity of frames of successively-obtained to-be-displayed images.

As an optional implementation, the target parameters in the first parameter matrices are 1, and the target parameters are distributed symmetrically along diagonals of the first parameter matrices.

As an optional implementation, a quantity of the target parameters in the first parameter matrices is determined according to preset bits of the pixel values in the to-bedisplayed image, and different preset bits correspond to different quantities of target parameters; and the preset bits are determined according to a difference between a total quantity of bits of the pixel values of the to-be-displayed images and a total quantity of bits of pixel values that the display screen is able to display.

As an optional implementation, when the preset bits are the last two bits of the pixel values in the to-be-displayed image and the target parameters are 1, the processor is configured to determine the quantity of the target parameters in the first parameter matrices as follows:

in a case that the preset bits are 00, the quantity of the target parameters in the first parameter matrices is 0;

in a case that the preset bits are 01, the quantities of the target parameters in each row and each column of the first parameter matrices are both 1;

in a case that the preset bits are 10, the quantities of the target parameters in each row and each column of the first parameter matrices are both 2; and in a case that the preset bits are 11, the quantities of the target parameters in each row and each column of the first parameter matrices are both 3.

As an optional implementation, the first parameter matrix includes a plurality of first sub-matrices, and the first parameter matrix is obtained by rotating one of the first sub-matrices anticlockwise or clockwise.

As an optional implementation, in a case that a plurality of frames of to-be-displayed images are obtained in a preset cycle, in the pixel values of adjacent frames of to-be-displayed images, ones of the first sub-matrices in the first parameter matrices corresponding to same preset bits are different; and the preset bits are determined according to a difference between a total quantity of bits of the pixel values of the to-be-displayed images and a total quantity of bits of pixel values that the display screen is able to display.

As an optional implementation, distribution of the plurality of first sub-matrices of the first parameter matrix is determined according to preset bits of the pixel values in the to-be-displayed image, and positional relationships determined by different preset bits are different.

As an optional implementation, when the preset bits are the last two bits of the pixel values in the to-be-displayed image, the processor is configured to determine the distribution of the plurality of first sub-matrices of the first parameter matrices as follows:

in a case that the preset bits are 01, the first sub-matrix located at an upper left corner of the first parameter matrix is fixed, and other first sub-matrices are obtained by rotating the first sub-matrix at the upper left corner anticlockwise or clockwise;

in a case that the preset bits are 10, the first sub-matrices on diagonals of the first parameter matrix are distributed symmetrically; and in a case that the preset bits are 11, the first sub-matrices on the diagonals of the first parameter matrix are same.

As an optional implementation, the first dither algorithm includes a set of first parameter matrices, the set of first parameter matrices includes a plurality of first parameter matrix groups, and each of the first parameter matrix groups includes a plurality of first parameter matrices;

where the set of first parameter matrices corresponds to a plurality of frames of to-be-displayed images obtained in a preset cycle, and each of the first parameter matrix groups corresponds to one frame of to-be-displayed image obtained.

As an optional implementation, the second dither algorithm includes a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

As an optional implementation, the target parameters in the second parameter matrices are distributed symmetrically.

As an optional implementation, when last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix; where the first candidate parameter matrix is a first parameter matrix corresponding to a pixel value with the last two bits being 01 in the first region, among a plurality of first parameter matrices in the first dither algorithm; or, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix; where the second candidate parameter matrix is a first parameter matrix corresponding to a pixel value with the last two bits being 10 in the first region, among the plurality of first parameter matrices in the first dither algorithm.

As an optional implementation, when last two bits of the pixel value in the second region of the to-be-displayed image are 11, the second parameter matrix is same as a third candidate parameter matrix;

where the third candidate parameter matrix is a first parameter matrix corresponding to a pixel value with the last two bits being 11 in the first region, among a plurality of first parameter matrices in the first dither algorithm.

As an optional implementation, in a case that a plurality of frames of to-be-displayed images are obtained in a preset cycle, in the pixel values of adjacent frames of to-be-displayed images, same preset bits correspond to a same second parameter matrix.

As an optional implementation, a size of the second parameter matrices is determined according to a size of first parameter matrices; or, the size of the second parameter matrices is determined according to a correspondence relationship between pixels of the to-be-displayed image and pixels of a non-fixation region of the display screen.

As an optional implementation, the second dither algorithm includes a set of second parameter matrices, the set of second parameter matrices includes a plurality of second parameter matrix groups, and each of the second parameter matrix groups includes a plurality of second parameter matrices;

where the set of second parameter matrices corresponds to a plurality of frames of to-be-displayed images obtained in a preset cycle, and each of the second parameter matrix groups corresponds to one frame of to-be-displayed image obtained.

As an optional implementation, the processor is configured to perform:

splitting the to-be-displayed image into a plurality of sub-images, each of the sub-images being a single-channel image;

determining first regions of the respective sub-images according to the first region of the to-be-displayed image, and determining second regions of the respective sub-images according to the second region of the to-be-displayed image;

for each of the sub-images, obtaining a rendered sub-image corresponding to the sub-image by rendering the first region of the sub-image according to the first dither algorithm and rendering the second region of the sub-image according to the second dither algorithm; and obtaining the rendered image by combining rendered sub-images corresponding to the sub-images.

As an optional implementation, the first dither algorithm includes the first parameter matrices, and the second dither algorithm includes the second parameter matrices; and the processor is configured to perform:

determining the first parameter matrices for traversing the first region according to pixel values of pixels of the first region; and rendering the pixel values in the first region according to parameters corresponding to pixel positions of the pixels and the pixel values of the pixels in the first parameter matrices during traversing; or, determining the second parameter matrices for traversing the second region according to pixel values of pixels of the second region; and rendering the pixel values in the second region according to parameters corresponding to pixel positions of the pixels and the pixel values of the pixels in the second parameter matrices during traversing.

In a third aspect, an embodiment of the present disclosure further provides an image processing apparatus based on a dither algorithm, including:

a region determining unit, configured to obtain a to-be-displayed image, and determine a first region and a second region of the to-be-displayed image, where the first region and the second region are determined according to a coverage range of a visual field of a user on a display screen;

an algorithm determining unit, configured to determine a first dither algorithm corresponding to the first region and a second dither algorithm corresponding to the second region, where parameter matrices of the first dither algorithm and the second dither algorithm are different; and a partition rendering unit, configured to obtain a rendered image of the to-be-displayed image by rendering the first region according to the first dither algorithm and rendering the second region according to the second dither algorithm, and display the rendered image on the display screen.

In a fourth aspect, an embodiment of the present disclosure further provides a computer storage medium, storing a computer program thereon, where the program, when executed by a processor, implements steps of the method in the first aspect above.

These or other aspects of the present disclosure will be clearer and more easily understood in the description of the following embodiments.

BRIEF DESCRIPTION OF FIGURES

In order to explain technical solutions in embodiments of the present disclosure more clearly, the following will briefly introduce the accompanying drawings that need to be used in the description of embodiments. Apparently, the accompanying drawings in the following description are only some embodiments of the present disclosure, and for those of ordinary skill in the art, on the premise of no creative labor, other accompanying drawings can further be obtained from these accompanying drawings.

FIG. 3 is an implementation flow diagram of an image processing method based on a dither algorithm according to an embodiment of the present disclosure.

FIG. 7 is a schematic diagram of first parameter matrices for a plurality of frames circulating according to an embodiment of the present disclosure.

FIG. 8 is a schematic diagram of second parameter matrices corresponding to a plurality of frames of to-be-displayed images in a cycle according to an embodiment of the present disclosure.

FIG. 9 is another schematic diagram of second parameter matrices corresponding to a plurality of frames of to-be-displayed images in a cycle according to an embodiment of the present disclosure.

FIG. 10 is a schematic diagram of an image processing solution based on a dither algorithm according to an embodiment of the present disclosure.

DETAILED DESCRIPTION

In order to make objects, technical solutions and advantages of the present disclosure clearer, the present disclosure will be further described in detail in combination with the accompanying drawings below. Apparently, the described embodiments are only part of embodiments of the present disclosure, not all of them. Based on embodiments of the present disclosure, all other embodiments obtained by those of ordinary skill in the art without creative work shall fall within the protection scope of the present disclosure.

In embodiments of the present disclosure, the term "and/or" describes the association relationship of associated objects, which represents that there can be three kinds of relationships, for example, A and/or B can represent that there are three kinds of situations: A alone, A and B at the same time, and B alone. The character "/" universally indicates that associated objects are in an "or" relationship.

Application scenarios described in embodiments of the present disclosure are to more clearly illustrate the technical solutions of embodiments of the present disclosure, and do not constitute a limitation on the technical solutions provided by embodiments of the present disclosure. It is known to those ordinarily skilled in the art that with the appearance of new application scenarios, the technical solutions provided by embodiments of the present disclosure are also suitable for similar technical problems. In the description of the present disclosure, unless otherwise stated, "plurality of" means two or more.

Figure 1:
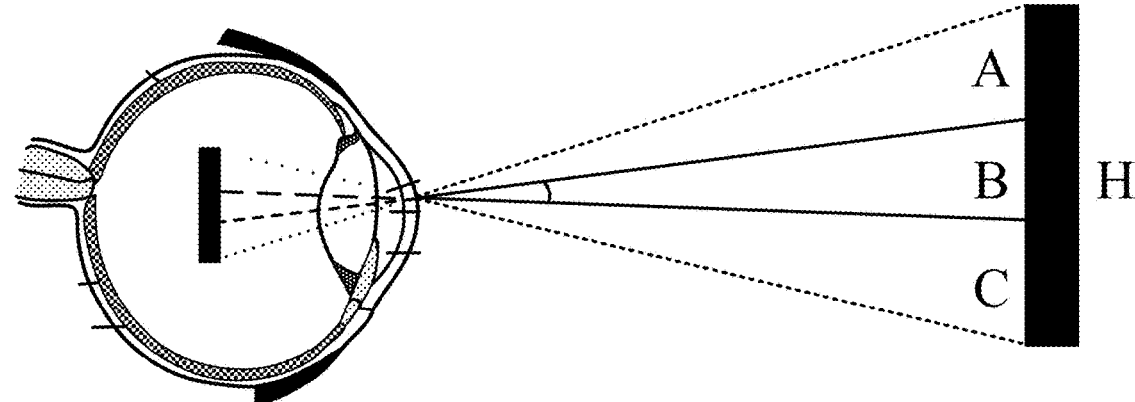
FIG. 1 is a schematic diagram of a principle of human eye imaging according to an embodiment of the present disclosure.

Embodiment 1 is as follows. In the process of human eye imaging, a central fovea visual field is clear in imaging, only covers 1° to 2° of the visual field, and is high in visual acuity, but surrounding visual fields are fuzzy in imaging. As shown in FIG. 1, an embodiment of the present disclosure provides a schematic diagram of a principle of human eye imaging. When a human eye is watching a screen H, the whole screen can be seen, but only the central fovea visual field at a region B is clear, and a region A and a region C are fuzzy in imaging. An intelligent screen split technology is that, with reference to the principle of human eye imaging, only a very small range of the central fovea visual field is rendered in an image rendering process, and fuzzy rendering is performed on a surrounding visual field region. When an eyeball rotates, a high-definition rendering region changes with the change of a fixation point, such that high-definition visual experience may be obtained, loads on a graphics processing unit (GPU) may also be lowered, and thus requirements of a virtual reality (VR) device on hardware may be greatly lowered.

A dither algorithm is a commonly used algorithm in image quality display, with a function of improving the accuracy of color display. The dither algorithm is to produce colors that an existing display device cannot produce in a simulating mode by using colors that the existing display device can display, that is, a larger quantity of colors of a to-be-displayed image are simulated by using a smaller quantity of colors that a display can display. For example, when a 30 bit ((10 bit)×3) picture is displayed on a 24 bit ((8 bit)×3) display device, an image closer to an original color image is output through the dither algorithm, instead of simply discarding low 2 bit significance bits.

Figure 2:
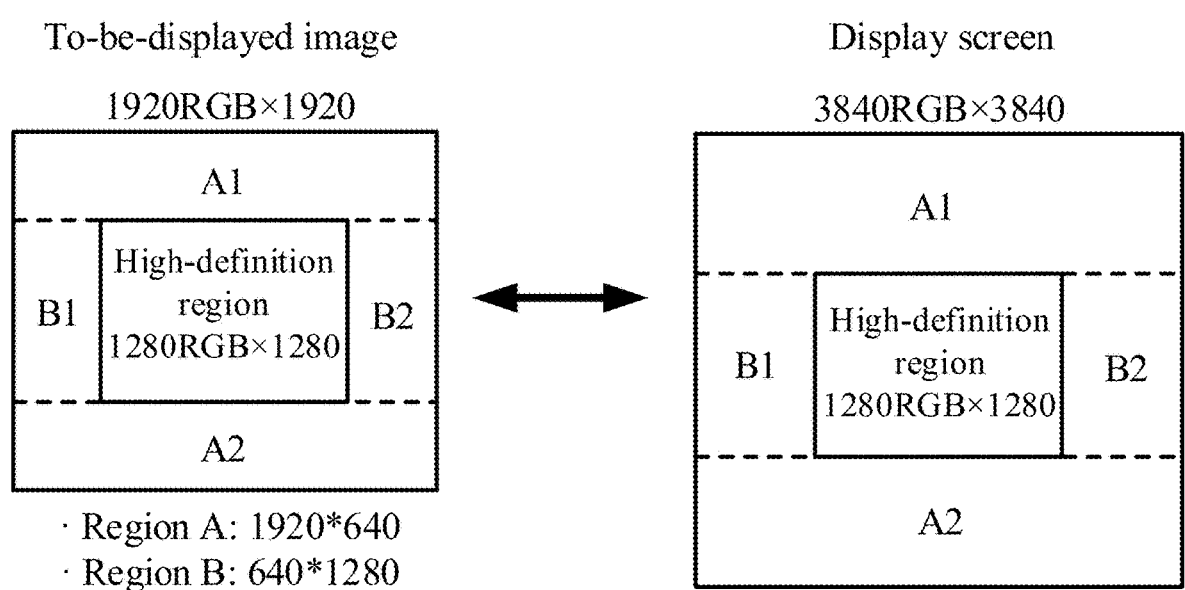
FIG. 2 is a schematic diagram of a correspondence relationship of image displaying regions in an intelligent screen split technology according to an embodiment of the present disclosure.

In an intelligent screen split application, pixels in the fixation region of the image are mapped to pixels on a screen one to one, while pixels in the non-fixation region of the image are mapped to the pixels on the screen one to many, which is fuzzy rendering. As shown in FIG. 2, the present embodiment provides a schematic diagram of a correspondence relationship of image displaying regions in the intelligent screen split technology. The left figure is a to-be-displayed image with a resolution of 1920×1920, and the right figure is a display screen with a resolution of 3840× 3840. When the to-be-displayed image is rendered to the display screen, a fixation region of the display screen and a high-definition region of the to-be-displayed image correspond pixel by pixel. For non-fixation regions A1 and A2, each pixel of the to-be-displayed image corresponds to 4×2 pixels on the display screen, and for non-fixation regions B1 and B2, each pixel of the to-be-displayed image corresponds to 1×4 pixels on the display screen. If the same dither scheme is used for both the non-fixation regions and the fixation region, the problems of unsmooth gray scale transition and interframe flicker may occur when A1, A2, B1 and B2 processed through the dither algorithm and junction parts with the high-definition region are mapped to the display screen.

In the present embodiment, by adopting different dither algorithms for different regions of the to-be-displayed image, full-screen smooth transition under screen split can be achieved, and the gray scale display accuracy can be improved.

As shown in FIG. 3, an image processing method based on a dither algorithm provided by the present embodiment may be applied to a display screen under an intelligent screen split scenario, and an implementation flow is as follows.

Step 300, a to-be-displayed image is obtained, and a first region and a second region of the to-be-displayed image are determined, where the first region and the second region are determined according to a coverage range of a visual field of a user on the display screen.

During implementation, the to-be-displayed image in the present embodiment is used for being displayed on the display screen, and by using an intelligent screen split technology, the display screen can determine the coverage range of the visual field of the user on the display screen according to tracking for eyes of the user, performing partition display intelligently on the display screen.

Optionally, the present embodiment determines the first region and the second region of the to-be-displayed image through following steps.

Step a, a fixation region and a non-fixation region on the display screen are determined according to a coverage range of a central fovea visual field of the user on the display screen.

During implementation, the coverage range of the central fovea visual field of the user on the display screen may be used as the fixation region, and a region except the fixation region is used as the non-fixation region.

Step b, the first region is determined according to the fixation region, the to-be-displayed image and a resolution of the display screen, where one pixel of the first region corresponds to one pixel of the fixation region.

In the present embodiment, the first region of the to-be-displayed image corresponds to the fixation region of the display screen, and when the fixation region of the display screen changes with the change of a fixation point of the user, the first region corresponding to the fixation region also changes accordingly.

During implementation, an image in the fixation region of the user is displayed in a high-definition mode, that is, pixels of the first region corresponding to the fixation region correspond to pixels of the fixation region on the display screen one to one, and the display effect of the to-be-displayed image can be guaranteed.

Step c, the second region is determined according to the non-fixation region, the to-be-displayed image and the resolution of the display screen, where one pixel of the second region corresponds to a plurality of pixels of the non-fixation region.

During implementation, fuzzy rendering is adopted for an image in the non-fixation region of the user, that is, one pixel in the second region of the to-be-displayed image corresponds to a plurality of pixels on the display screen.

During implementation, after the positions of the first region and the second region in the to-be-displayed image are determined, a region where each pixel point of the obtained to-be-displayed image is located is determined. Taking the to-be-displayed image on the left in FIG. 2 as an example, the first region is the high-definition region, the second region includes a region A and a region B, the region A includes A1 and A2, and the region B includes B1 and B2.

it is assumed that position coordinates of a pixel of the obtained to-be-displayed image are imdata_image_x (corresponding to a column) and imdata_image_y (corresponding to a row) respectively; and starting and ending row numbers of the high-definition region on the to-be-displayed image are image_start_row and image_end_row respectively, and starting and ending column numbers of the high-definition region are image_start_col and image_end_col respectively, a region where the pixel is located is determined as follows.

(1) When image_y≥image_start_row && image_y≤image_end_row && image_x≥image_start_col && image_x≤image_end_col, it is determined that the pixel is in the high-definition region, and it is set that areaFlag=0.

(2) When image_y≥image_start_row && image_y≤image_end_row && (image_x<image_start_col or image_x>image_end_col), it is determined that the pixel is in the region B, and it is set that areaFlag=1.

(3) When image_y>image_end_row or image_y<image_start_row, it is determined that the pixel is in the region A, and it is set that areaFlag=2.

Where areaFlag represents the position of the region corresponding to the pixel.

Step 301, a first dither algorithm corresponding to the first region and a second dither algorithm corresponding to the second region are determined, where parameter matrices of the first dither algorithm and the second dither algorithm are different.

During implementation, different regions in the to-be-displayed image are rendered by using different dither algorithms, where the first region corresponds to the fixation region, the second region corresponds to the non-fixation region, and by using the different dither algorithms, when the first region and the second region are mapped onto the display screen to be displayed, the problems of unsmooth gray scale transition and interframe flicker can be relieved.

The dither algorithms in the present embodiment include parameter matrices, elements in the parameter matrices are 0 or 1, and the to-be-displayed image is traversed by using the parameter matrices, so that each pixel of the to-be-displayed image is processed based on parameters of the parameter matrices, achieving a gray scale smooth effect.

Step 302, a rendered image of the to-be-displayed image is obtained by rendering the first region according to the first dither algorithm and rendering the second region according to the second dither algorithm, and the rendered image is displayed on the display screen.

In some embodiments, the rendered image is determined through following steps.

Step d1, the to-be-displayed image is split into a plurality of sub-images, each of the sub-images being a single-channel image.

During implementation, when the to-be-displayed image is an RGB image, the to-be-displayed image is split into three sub-images, which are an R-channel image, a G-channel image and a B-channel image respectively. Each of the sub-images is a gray-scale map, and a pixel value of each of the sub-images is a gray value (gray scale value).

Step d2, first regions of the respective sub-images are determined according to the first region of the to-be-displayed image, and second regions of the respective sub-images are determined according to the second region of the to-be-displayed image.

The position of the first region of the to-be-displayed image is the same as the positions of the first regions of the sub-images, and similarly, the position of the second region of the to-be-displayed image is the same as the positions of the second regions of the sub-images.

Step d3, for each of the sub-images, a rendered sub-image corresponding to the sub-image is obtained by rendering the first region of the sub-image according to the first dither algorithm and rendering the second region of the sub-image according to the second dither algorithm.

Step d4, the rendered image is obtained by combining rendered sub-images corresponding to the sub-images.

In the present embodiment, when the to-be-displayed image is rendered by using the dither algorithm, for the convenience of calculation, the to-be-displayed image is split into a plurality of single-channel images, namely the plurality of sub-images. In this case, each sub-image is a gray-scale map, and the pixel value of each sub-image is a gray value; and then different regions of each sub-image are rendered by using different dither algorithms, and the final rendered image is obtained finally by combining all the rendered sub-images after rendering. It should be noted that, as the sub-images are the single-channel images obtained by splitting the to-be-displayed image, the positions of the first region and the second region in the to-be-displayed image are the same as the positions in the sub-images, and the first region and the second region of each sub-image are determined after the first region and the second region of the to-be-displayed image are determined.

In some embodiments, the first dither algorithm includes first parameter matrices; and the first region is rendered through following steps.

Step e1, the first parameter matrices for traversing the first region are determined according to pixel values of pixels of the first region.

Step e2, the pixel values in the first region are rendered according to parameters corresponding to pixel positions of the pixels and the pixel values of the pixels in the first parameter matrices during traversing.

Optionally, the pixel values in the first region are rendered by using the parameters corresponding to the pixel positions of the pixels and preset bits (e.g., the last two bits) of the pixel values of the pixels.

In some embodiments, the second dither algorithm includes second parameter matrices; and the second region is rendered through following steps.

Step f1, the second parameter matrices for traversing the second region are determined according to the pixel values of the pixels of the second region.

Step f2, the pixel values in the second region are rendered according to parameters corresponding to pixel positions of the pixels and the pixel values of the pixels in the second parameter matrices during traversing.

Optionally, the pixel values in the second region are rendered by using the parameters corresponding to the pixel positions of the pixels and preset bits (e.g., the last two bits) of the pixel values of the pixels.

The dither algorithms in the present embodiment traverse the to-be-displayed image by using the parameter matrices, and parameters at corresponding positions in the parameter matrices are selected according to the positions of the pixels in the to-be-displayed image in the parameter matrices and the pixel values corresponding to the pixels.

Figure 4:
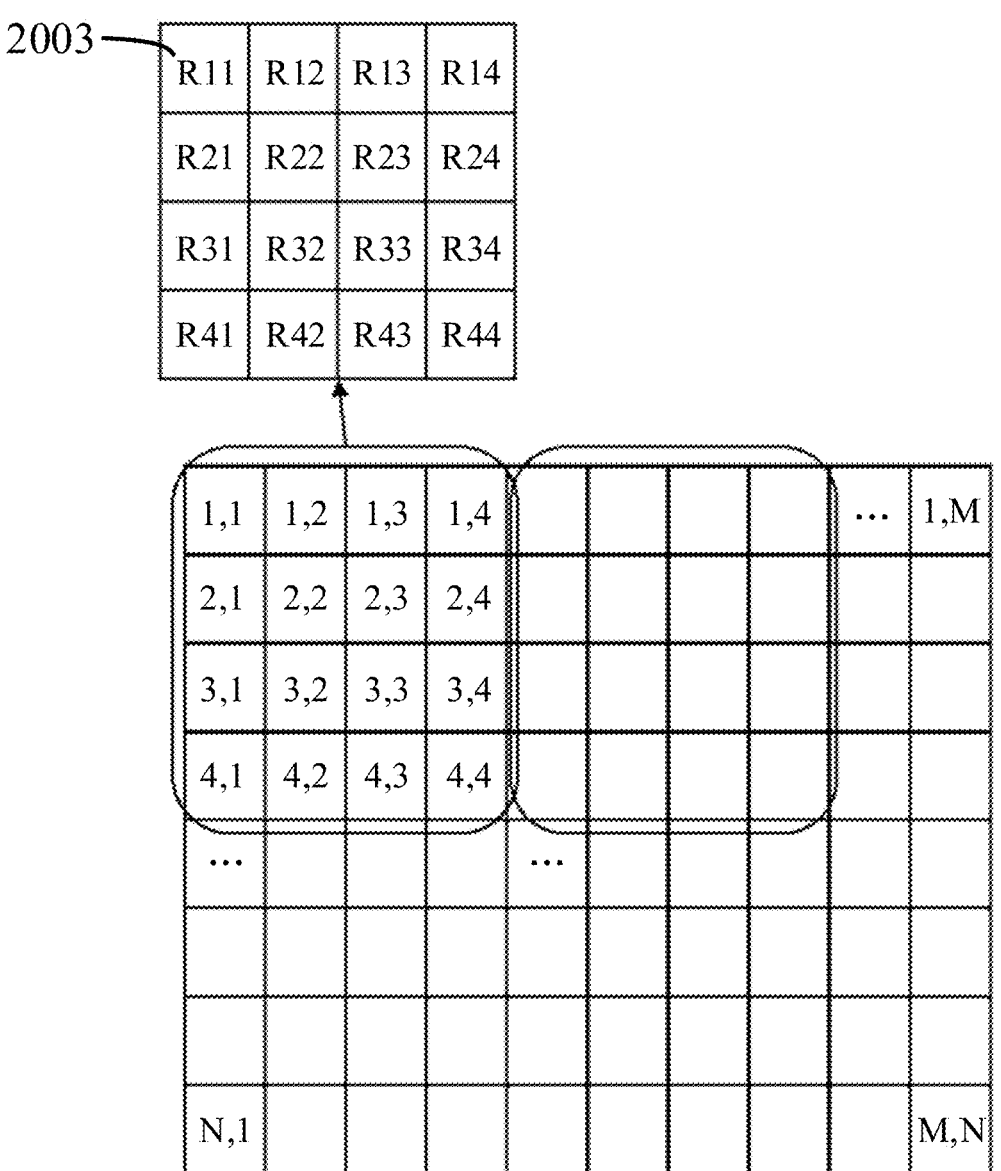
FIG. 4 is a schematic diagram of a dither algorithm according to an embodiment of the present disclosure.

As shown in FIG. 4, FIG. 4 is a schematic diagram of a dither algorithm provided by the present embodiment, where a parameter matrix is 4×4, a traversing step length is 4. For a to-be-displayed image with a resolution of M×N, the to-be-displayed image is set to be a $0^{th}$ frame input into a display screen, R11-R44 are pixel values of an R-channel image of the to-be-displayed image covered by a 4×4 parameter matrix. For a position R11, a pixel value at the position R11 is 2003 (12 bits in total), corresponding to a binary system of 0111 1101 0011, high 10 bits are 0111 1101 00, low 2 bits are 11, then a dither template used may be determined according to a quantity of frames and the low 2 bits. If a parameter of the template corresponding to the position R11 is 1, 10 bit data which are output finally at the position are b'40 0111 1101 00+1=d'126.

In some embodiments, the first dither algorithm in the present embodiment includes a plurality of first parameter matrices; the plurality of first parameter matrices are used for processing different pixel values in the first region of the to-be-displayed image; and target parameters in the first parameter matrices are distributed symmetrically.

During implementation, the problem of uneven gray scales in space can be avoided by using the symmetrical distribution of the target parameters. Optionally, the symmetrical distribution in the present embodiment includes but is not limited to symmetrical distribution about horizontal axes of the first parameter matrices, symmetrical distribution about vertical axes of the first parameter matrices, and symmetrical distribution about diagonals of the first parameter matrices, which is not limited too much in the present embodiment.

In some embodiments, the target parameters in the first parameter matrices are 1, and the target parameters are distributed symmetrically along diagonals of the first parameter matrices.

In some embodiments, if a plurality of frames of to-be-displayed images are obtained in a preset cycle, then in adjacent frames of to-be-displayed images, the target parameters in the first parameter matrices corresponding to pixel values at a same pixel position are same in quantity and different in position; where the preset cycle is determined according to a quantity of frames of successively-obtained to-be-displayed images.

During implementation, in the adjacent frames of to-be-displayed images, the target parameters in the first parameter matrices corresponding to the pixel values at the same pixel position are the same in quantity and different in position, so that an obvious visual effect caused by gray scale superposition at the same pixel position is avoided.

Optionally, the preset cycle in the present embodiment is a cycle in which four frames of to-be-displayed images are obtained, or a cycle in which 12 frames of to-be-displayed images are obtained, or the like, and the size of the preset cycle may be determined according to actual requirements, which is not limited too much in the present embodiment.

In some embodiments, the first dither algorithm includes a set of first parameter matrices, the set of first parameter matrices includes a plurality of first parameter matrix groups, and each of the first parameter matrix groups includes a plurality of first parameter matrices.

The set of first parameter matrices corresponds to a plurality of frames of to-be-displayed images obtained in a preset cycle, and each of the first parameter matrix groups corresponds to one frame of to-be-displayed image obtained.

In some embodiments, a quantity of the target parameters in the first parameter matrices is determined according to preset bits of the pixel values in the to-be-displayed images, and different preset bits correspond to different quantities of target parameters; where different preset bits correspond to different first parameter matrices, and the quantities of the target parameters in the corresponding first parameter matrices are also different.

The preset bits are determined according to a difference between a total quantity of bits of the pixel values of the to-be-displayed images and a total quantity of bits of pixel values that the display screen is able to display.

For example, when the total quantity of the bits of the pixel values of the to-be-displayed images is 12 bits, and the total quantity of the bits of the pixel values that the display screen is able to display is 10 bits, the preset bits are the last two bits of the pixel values in the to-be-displayed images.

Optionally, when the preset bits are the last two bits of the pixel values in the to-be-displayed image and the target parameters are 1, the quantity of the target parameters in the first parameter matrices is determined as follows.

If the preset bits are 00, the quantity of the target parameters in the first parameter matrices is 0.

If the preset bits are 01, the quantities of the target parameters in each row and each column of the first parameter matrices are both 1.

If the preset bits are 10, the quantities of the target parameters in each row and each column of the first parameter matrices are both 2.

If the preset bits are 11, the quantities of the target parameters in each row and each column of the first parameter matrices are both 3.

In some embodiments, the first parameter matrix includes a plurality of first sub-matrices, and the first parameter matrix is obtained by rotating one of the first sub-matrices anticlockwise or clockwise.

During implementation, taking a 4×4 first parameter matrix as an example, the first parameter matrix includes four 2×2 first sub-matrices, the first sub-matrix at the upper left corner may be fixed, and the other three first sub-matrices are obtained by rotating the first sub-matrix at the upper left corner anticlockwise or clockwise. Similarly, the first sub-matrix at the lower left corner may also be fixed, and the other three first sub-matrices are obtained by rotating the first sub-matrix at the lower left corner anticlockwise or clockwise. The first sub-matrix at the upper right corner or the lower right corner may also be fixed, and the other three first sub-matrices are obtained by rotating the fixed first sub-matrix anticlockwise or clockwise.

In some embodiments, if a plurality of frames of to-be-displayed images are obtained in a preset cycle, then in the pixel values of the adjacent frames of to-be-displayed images, ones of the first sub-matrices in the first parameter matrices corresponding to same preset bits are different; and the preset bits are determined according to the difference between the total quantity of the bits of the pixel values of the to-be-displayed images and the total quantity of the bits of the pixel values that the display screen is able to display.

In some embodiments, the second dither algorithm includes a set of second parameter matrices, the set of second parameter matrices includes a plurality of second parameter matrix groups, and each of the second parameter matrix groups includes a plurality of second parameter matrices.

The set of second parameter matrices corresponds to a plurality of frames of to-be-displayed images obtained in a preset cycle, and each of the second parameter matrix groups corresponds to one frame of to-be-displayed image obtained.

During implementation, in order to guarantee a gray scale smooth effect in time, in time, the visual quality of a video is improved through a frame circulating manner, taking a 4×4 first parameter matrix as an example, the first parameter matrix includes four 2×2 first sub-matrices, in a preset cycle (i.e., a frame circulation), 2×2 first sub-matrices at upper left corners of adjacent frames may be set to be different, and the other three 2×2 first sub-matrices may be obtained through the 2×2 first sub-matrices at the upper left corners anticlockwise or clockwise.

Figure 5:
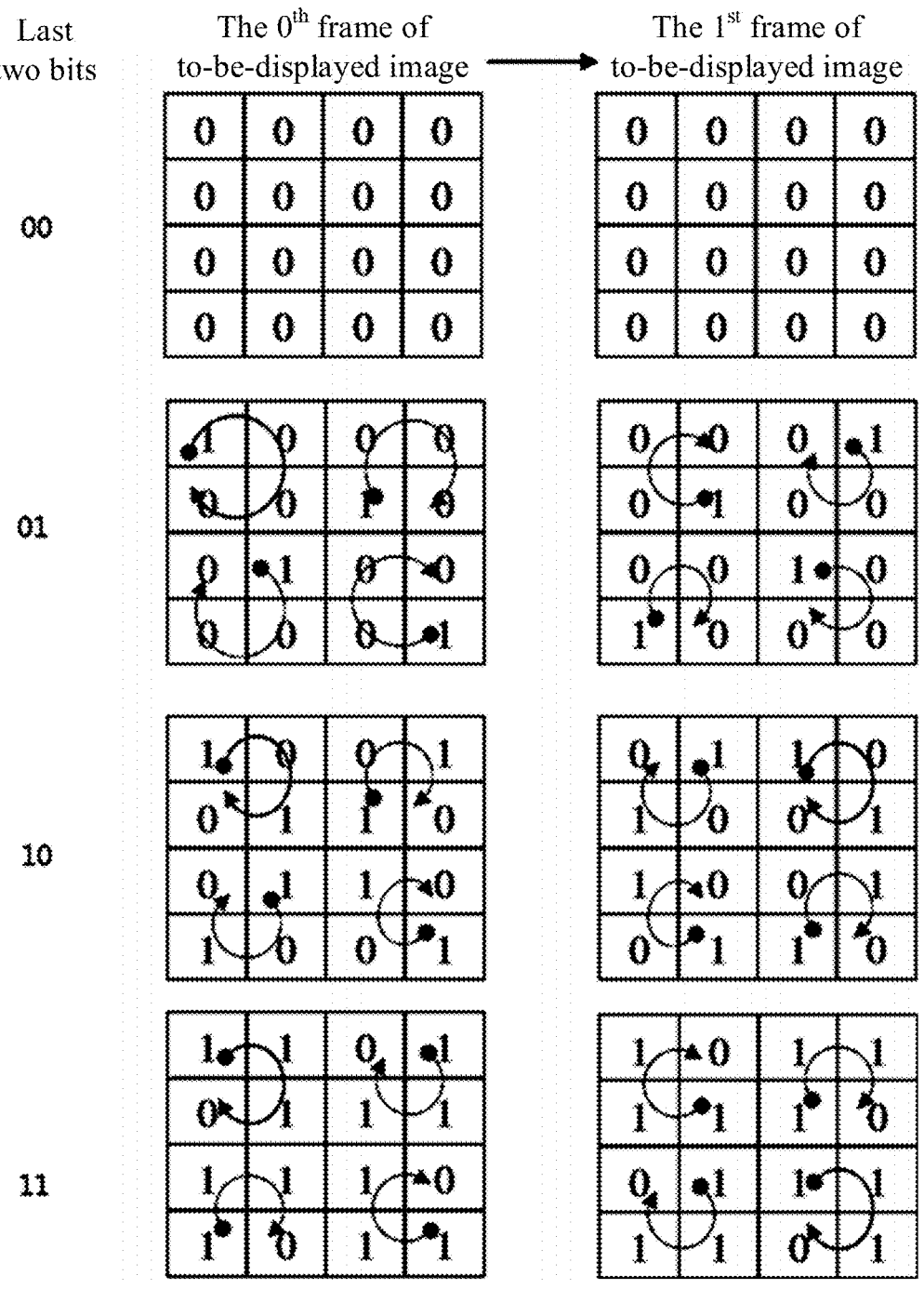
FIG. 5 is a schematic diagram of design of first parameter matrices according to an embodiment of the present disclosure.

As shown in FIG. 5, the present embodiment provides a schematic diagram of design of first parameter matrices, for example, 4×4 first parameter matrices. It is supposed that two frames of to-be-displayed images are obtained successively, which are the $0^{th}$ frame of to-be-displayed image and the $1^{st}$ frame of to-be-displayed image respectively. The $0^{th}$ frame of to-be-displayed image corresponds to four first parameter matrices on the left, and the $1^{st}$ frame of to-be-displayed image corresponds to four first parameter matrices on the right.

Each first parameter matrix corresponds to the last two bits of pixel values of a to-be-displayed image. When the last two bits are 00, all positions in the first parameter matrices corresponding to two frames of to-be-displayed images are 0; and when the last two bits are 01, each row and each column in the first parameter matrices each have one parameter being 1, when the last two bits are 10, each row and each column in the first parameter matrices each have two parameters being 1, and when the last two bits are 11, each row and each column in the first parameter matrices each have three parameters being 1.

When designing the first parameter matrix, a 2×2 first sub-matrix is taken as a basic unit, the 2×2 first sub-matrix at the upper left corner is fixed, and the other three 2×2 first sub-matrices may be obtained through the 2×2 first sub-matrix at the upper left corner anticlockwise or clockwise. In time, the frame circulation manner may be adopted, in one preset cycle, the 2×2 first sub-matrices at the upper left corners of adjacent frames are set to be different, and the other three 2×2 first sub-matrices at the upper left corners may be obtained through the 2×2 first sub-matrices at the upper left corners anticlockwise or clockwise.

In some embodiments, the first parameter matrix includes the plurality of first sub-matrices, and the first parameter matrix is obtained by rotating one of the first sub-matrices anticlockwise or clockwise; and distribution of the plurality of first sub-matrices of the first parameter matrix is determined according to the preset bits of the pixel values in the to-be-displayed image, and positional relationships determined by different preset bits are different.

Optionally, when the preset bits are the last two bits of the pixel values in the to-be-displayed image, the distribution of the plurality of first sub-matrices of the first parameter matrix is determined as follows.

If the preset bits are 01, the first sub-matrix located at an upper left corner of the first parameter matrix is fixed, and other first sub-matrices are obtained by rotating the first sub-matrix at the upper left corner anticlockwise or clockwise.

If the preset bits are 10, the first sub-matrices on diagonals of the first parameter matrix are distributed symmetrically.

If the preset bits are 11, the first sub-matrices on the diagonals of the first parameter matrix are same.

Figure 6:
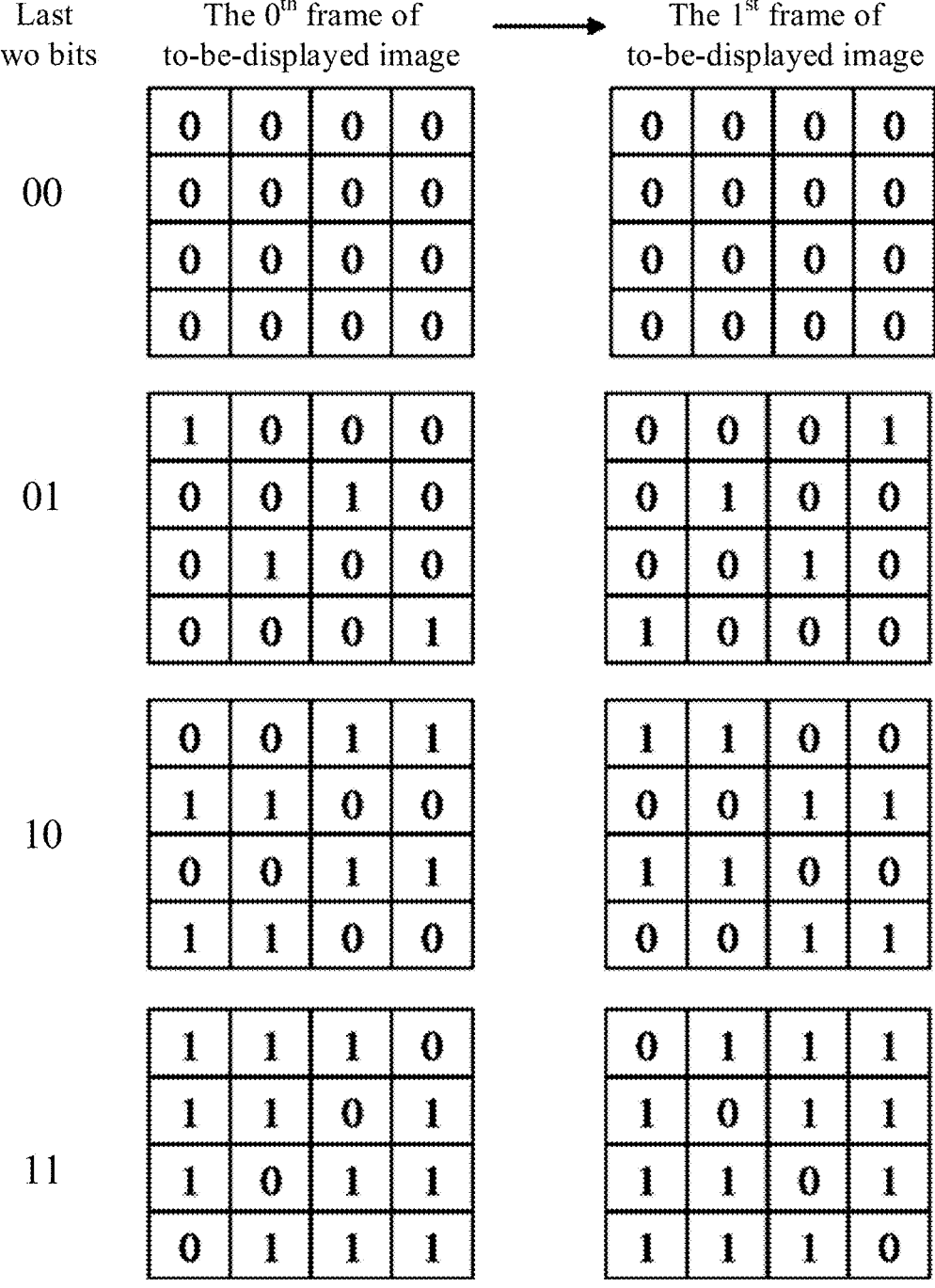
FIG. 6 is another schematic diagram of design of first parameter matrices according to an embodiment of the present disclosure.

As shown in FIG. 6, the present embodiment provides another schematic diagram of design of first parameter matrices, for example, 4×4 first parameter matrices. It is supposed that two frames of to-be-displayed images are obtained successively, which are the $0^{th}$ frame of to-be-displayed image and the $1^{st}$ frame of to-be-displayed image respectively. The $0^{th}$ frame of to-be-displayed image corresponds to four first parameter matrices on the left, and the $1^{st}$ frame of to-be-displayed image corresponds to four first parameter matrices on the right.

Each first parameter matrix corresponds to the last two bits of pixel values of a to-be-displayed image. When designing the first parameter matrix, a 2×2 first sub-matrix is taken as a basic unit. When the last two bits are 00, all positions in the first parameter matrices corresponding to two frames of to-be-displayed images are 0; when the last two bits are 01, the 2×2 first sub-matrix at the upper left corner is fixed, and the other three 2×2 first sub-matrices may be obtained through the 2×2 first sub-matrix at the upper left corner anticlockwise or clockwise; when the last two bits are 10, the 2×2 first sub-matrices on a diagonal of each first parameter matrix are distributed symmetrically; and when the last two bits are 11, the 2×2 first sub-matrices on a diagonal of each first parameter matrix are same.

In time, the frame circulation manner may be adopted, in one preset cycle, the 2×2 first sub-matrices at the upper left corners of adjacent frames are set to be different, and the other three 2×2 first sub-matrices at the upper left corners may be obtained through the 2×2 first sub-matrices at the upper left corners anticlockwise or clockwise.

Figure 7:
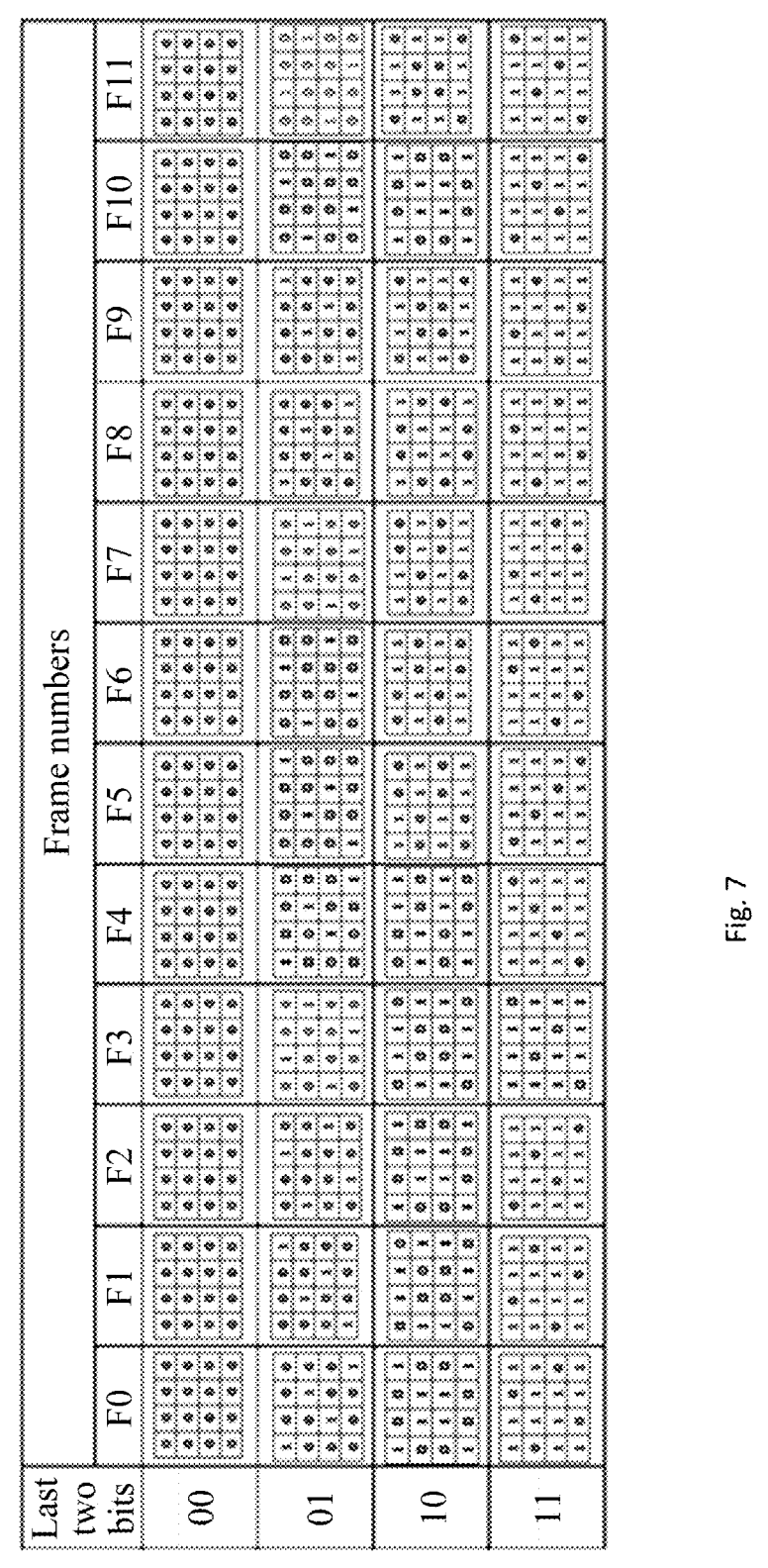

The above two manners of designing the first parameter matrices can both guarantee that, in each 4×4 first parameter matrix, the quantities of parameters 1 are symmetrically distributed about the diagonal. By combining the above two design manners, a dither algorithm with 12 frames as one preset cycle may further be designed, as shown in FIG. 7, FIG. 7 is a schematic diagram of first parameter matrices for a plurality of frames circulating designed in the present embodiment.

In some embodiments, the second dither algorithm in the present embodiment includes a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

In some embodiments, the target parameters in the second parameter matrices are distributed symmetrically. During implementation, when the target parameters are 1, parameters 1 in the second parameter matrices are symmetrically distributed about diagonals.

In some embodiments, when the last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix.

The first candidate parameter matrix is a first parameter matrix corresponding to a pixel value with the last two bits being 01 in the first region, among the plurality of first parameter matrices in the first dither algorithm.

In some embodiments, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix.

The second candidate parameter matrix is a first parameter matrix corresponding to a pixel value with the last two bits being 10 in the first region, among the plurality of first parameter matrices in the first dither algorithm.

It should be noted that, taking the second region being the region A in FIG. 2 as an example, the target parameters are 1, each pixel of the to-be-displayed image corresponds to 4×2 pixels on the display screen, that is, pixel values at the same position after dither are to be replicated to 4×2 pixels on the display screen for display. If the region A adopts the same parameter matrices as the high-definition region (i.e., the first region), a block phenomenon may exist in space, a flicker phenomenon may exist in time, and thus the parameters 1 at the time when the last two bits are 01 or 10 shall be reduced as far as possible in space, and the parameters 1 are not adjacent in space to avoid obvious bright blocks appearing to the pixel values after dither.

In some embodiments, when the last two bits of the pixel value in the second region of the to-be-displayed image are 11, the second parameter matrix is same as a third candidate parameter matrix.

The third candidate parameter matrix is a first parameter matrix corresponding to a pixel value with the last two bits being 11 in the first region, among the plurality of first parameter matrices in the first dither algorithm.

During implementation, taking the second region being the region A in FIG. 2 as an example, the target parameters are 1. Because in a gray scale transition figure, a pixel value with the last two bits being 11 is adjacent to a pixel value with the last two bits being 00, pixel values after dither on parameters 1 in second parameter matrices corresponding the last two bits being 11 are the same as pixel values after dither on parameters 1 in second parameter matrices corresponding to the last two bits being 00, if the quantity of the parameters 1 is reduced, that part may be unsmooth in transition, and thus when the last two bits are 11, corresponding first parameter matrices may be used as the second parameter matrices.

In some embodiments, if a plurality of frames of to-be-displayed images are obtained in a preset cycle, in the pixel values of the adjacent frames of to-be-displayed images, same preset bits correspond to a same second parameter matrix.

During implementation, in order to avoid the interframe flicker phenomenon in time, corresponding parameter matrices between frames shall reduce interframe alternation as much as possible, that is, it should guarantee to the maximum extent that the second parameter matrices corresponding to the same preset bits are same in the pixel values of the adjacent frames of to-be-displayed images.

In some embodiments, a size of the second parameter matrices is determined according to a size of the first parameter matrices; or, the size of the second parameter matrices is determined according to a correspondence relationship between pixels of the to-be-displayed images and pixels of the non-fixation region of the display screen.

During implementation, for the second region, at least two design methods may be included, as follows.

Method 1), on the basis of the pixels on the to-be-displayed images, each second parameter matrix corresponds to a 4×4 region on the to-be-displayed images.

Figure 8:
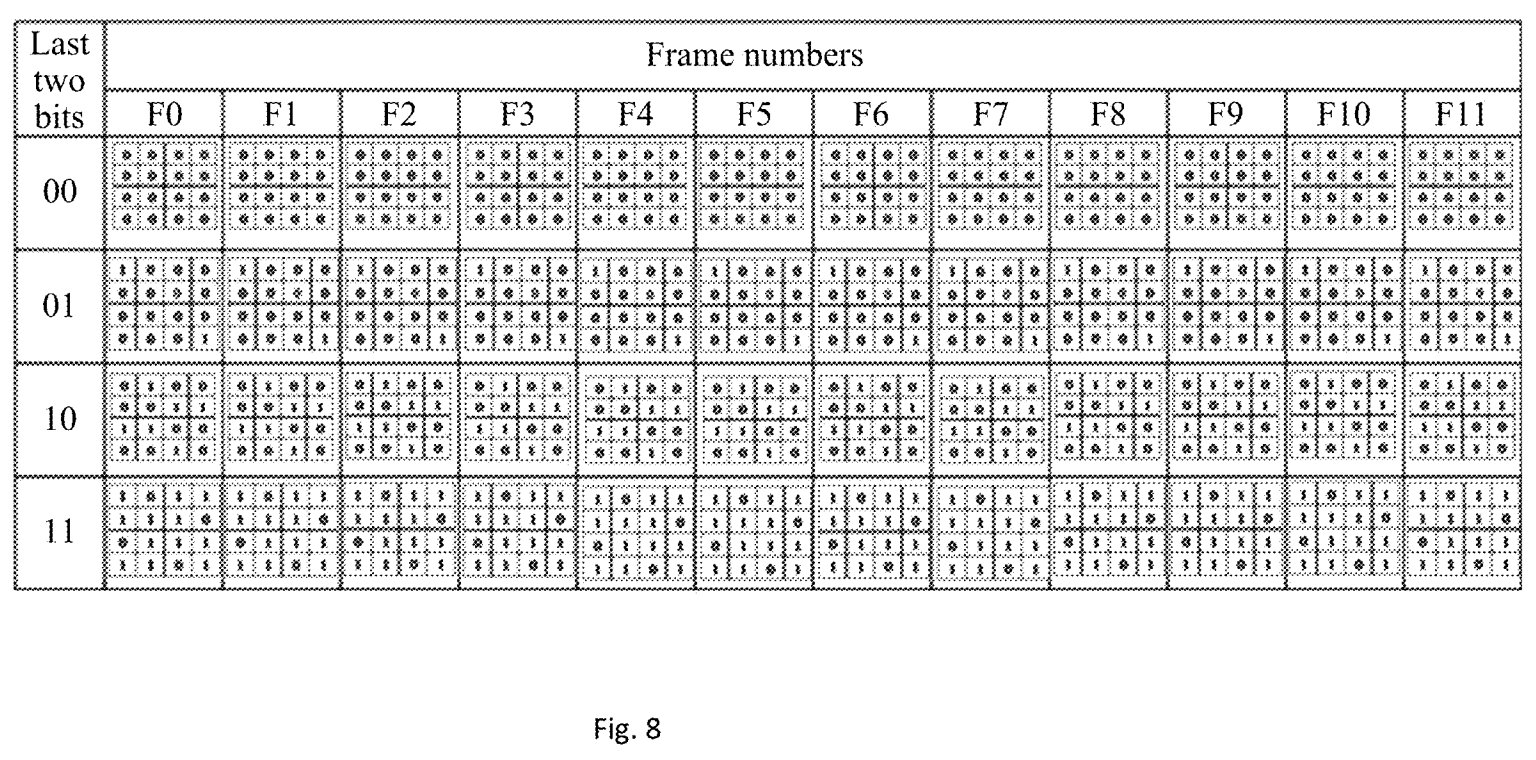

As shown in FIG. 8, the present embodiment provides second parameter matrices corresponding to a plurality of frames of to-be-displayed images in a cycle. With 12 frames as a preset cycle, taking the second region being the region A in FIG. 2 as an example, the target parameters are 1, each pixel of the to-be-displayed images corresponds to 4×2 pixels on the display screen, that is, pixel values at the same position after dither are to be replicated to 4×2 pixels on the display screen for display, and the design method of the second parameter matrices is on the basis that: the parameters 1 are symmetrically distributed about diagonals of the second parameter matrices.

When the last two bits of the pixel values in the to-be-displayed images are 00, the second parameter matrices are 0.

When the last two bits of the pixel values in the to-be-displayed images are 01, if the quantities of the parameters 1 in each row and each column of the first parameter matrices are both 1, then the second parameter matrices are less than the first parameter matrices in quantity of the parameters 1, and the parameters 1 in the second parameter matrices are not adjacent in space.

When the last two bits of the pixel values in the to-be-displayed images are 10, if the quantities of the parameters 1 in each row and each column of the first parameter matrices are both 2, then the second parameter matrices are less than the first parameter matrices in quantity of the parameters 1, and the parameters 1 in the second parameter matrices are not adjacent in space.

When the last two bits of the pixel values in the to-be-displayed images are 11, the second parameter matrices are the same as the first parameter matrices corresponding to the pixel values with the last two bits being 11 in the to-be-displayed images.

When the last two bits of the pixel values in the adjacent frames of to-be-displayed images are the same, the second parameter matrices corresponding to the adjacent frames of to-be-displayed images respectively are the same.

Method 2), on the basis of the pixels on the display screen, each second parameter matrix corresponds to an N×N rectangular region on the display screen, where N is a positive integer.

Figure 9:
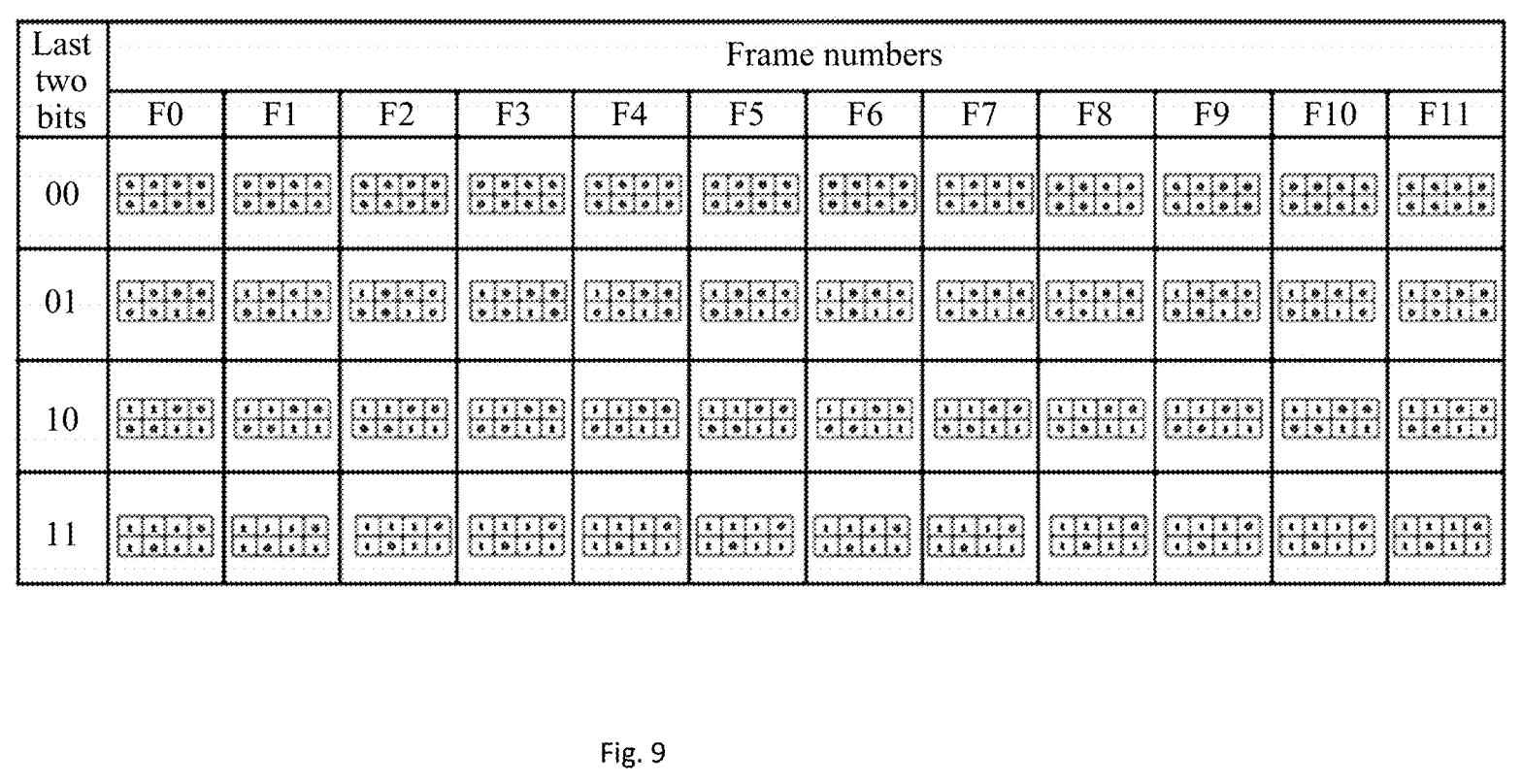

As shown in FIG. 9, the present embodiment provides other second parameter matrices corresponding to a plurality of frames of to-be-displayed images in a cycle. With 12 frames as a preset cycle, taking the second region being the region A in FIG. 2 as an example, the target parameters are 1, each pixel of the to-be-displayed images corresponds to 4×2 pixels on the display screen, that is, pixel values at the same position after dither are to be replicated to 4×2 pixels on the display screen for display, then the second parameter matrices corresponding to the region A shall be designed to a size of $r_A \times c_A$, where $r_A : c_A = 1:2$. Meanwhile, in order to guarantee that the quantities of the parameters 1 in the corresponding second parameter matrices are different when the last two bits of the pixel values are different, 2×4 second parameter matrices may be adopted to traverse the region A of each to-be-displayed image. For the region B in FIG. 2, each pixel of the to-be-displayed images corresponds to 1×4 pixels on the display screen, and then the second parameter matrices corresponding to the region B shall be designed to a size of $r_B \times c_B$, where $r_B : c_B = 4:1$.

The design method of the second parameter matrices is on the basis that: the parameters 1 are symmetrically distributed about the diagonals of the second parameter matrices.

When the last two bits of the pixel values in the to-be-displayed images are 00, the second parameter matrices are 0.

When the last two bits of the pixel values in the to-be-displayed images are 01, if the quantities of the parameters 1 in each row and each column of the first parameter matrices are both 1, then the second parameter matrices are less than the first parameter matrices in quantity of the parameters 1, and the parameters 1 in the second parameter matrices are not adjacent in space.

When the last two bits of the pixel values in the to-be-displayed images are 10, if the quantities of the parameters 1 in each row and each column of the first parameter matrices are both 2, then the second parameter matrices are less than the first parameter matrices in quantity of the parameters 1, and the parameters 1 in the second parameter matrices are not adjacent in space.

When the last two bits of the pixel values in the to-be-displayed images are 11, the second parameter matrices are the same as the first parameter matrices corresponding to the pixel values with the last two bits being 11 in the to-be-displayed images.

When the last two bits of the pixel values in the adjacent frames of to-be-displayed images are the same, the second parameter matrices corresponding to the adjacent frames of to-be-displayed images respectively are the same.

As shown in FIG. 10, the present embodiment provides an image processing solution based on a dither algorithm, and a specific implementation flow is as follows.

Step 1000, a plurality of frames of to-be-displayed images are obtained.

Step 1001, a fixation region and a non-fixation region on a display screen are determined according to a coverage range of a central fovea visual field of a user on the display screen; and a first region is determined according to the fixation region, the to-be-displayed images and a resolution of the display screen, and a second region is determined according to the non-fixation region, the to-be-displayed images and the resolution of the display screen.

One pixel of the first region corresponds to one pixel of the fixation region; and one pixel of the second region corresponds to a plurality of pixels of the non-fixation region.

Step 1002, each frame of to-be-displayed image is split into a plurality of sub-images, first regions of the respective sub-images are determined according to the first region of the to-be-displayed image, and second regions of the respective sub-images are determined according to the second region of the to-be-displayed image.

Each of the sub-images is a single-channel image.

Step 1003, for each of the sub-images, a rendered sub-image corresponding to the sub-image is obtained by rendering the first region of the sub-image according to a first dither algorithm and rendering the second region of the sub-image according to a second dither algorithm.

Step 1004, a rendered image is obtained by combining rendered sub-images corresponding to the sub-images, and the rendered image is displayed on the display screen.

Embodiment 2 is as follows. Based on the same inventive concept, an embodiment of the present disclosure further provides a display device. Since the device is a device in the method in embodiments of the present disclosure and the principle of solving problems of the device is similar to that of the method, implementation of the device may refer to implementation of the method, and repetitions are omitted.

Figure 11:
FIG. 11 is a schematic diagram of a display device according to an embodiment of the present disclosure.

As shown in FIG. 11, the device includes a display screen 1100 and a processor 1101, where:

the display screen 1100 is configured to display contents; and the processor 1101 is configured to perform following steps:

obtaining a to-be-displayed image, and determining a first region and a second region of the to-be-displayed image, where the first region and the second region are determined according to a coverage range of a visual field of a user on a display screen;

determining a first dither algorithm corresponding to the first region and a second dither algorithm corresponding to the second region, where parameter matrices of the first dither algorithm and the second dither algorithm are different; and obtaining a rendered image of the to-be-displayed image by rendering the first region according to the first dither algorithm and rendering the second region according to the second dither algorithm, and displaying the rendered image on the display screen.

As an optional implementation, the processor 1101 is configured to perform:

determining a fixation region and a non-fixation region on the display screen according to a coverage range of a central fovea visual field of the user on the display screen;

determining the first region according to the fixation region, the to-be-displayed image and a resolution of the display screen, where one pixel of the first region corresponds to one pixel of the fixation region; and determining the second region according to the non-fixation region, the to-be-displayed image and the resolution of the display screen, where one pixel of the second region corresponds to a plurality of pixels of the non-fixation region.

As an optional implementation, the first dither algorithm includes a plurality of first parameter matrices; the plurality of first parameter matrices are used for processing different pixel values in the first region of the to-be-displayed image; and target parameters in the first parameter matrices are distributed symmetrically.

As an optional implementation, if a plurality of frames of to-be-displayed images are obtained in a preset cycle, in adjacent frames of to-be-displayed images, the target parameters in the first parameter matrices corresponding to pixel values at a same pixel position are same in quantity and different in position;

where the preset cycle is determined according to a quantity of frames of successively-obtained to-be-displayed images.

As an optional implementation, the target parameters in the first parameter matrices are 1, and the target parameters are distributed symmetrically along diagonals of the first parameter matrices.

As an optional implementation, a quantity of the target parameters in the first parameter matrices is determined according to preset bits of the pixel values in the to-be-displayed image, and different preset bits correspond to different quantities of target parameters; and the preset bits are determined according to a difference between a total quantity of bits of the pixel values of the to-be-displayed images and a total quantity of bits of pixel values that the display screen is able to display.

As an optional implementation, when the preset bits are last two bits of the pixel values in the to-be-displayed image and the target parameters are 1, the processor 1101 is configured to determine the quantity of the target parameters in the first parameter matrices as follows:

if the preset bits are 00, the quantity of the target parameters in the first parameter matrices is 0;

if the preset bits are 01, the quantities of the target parameters in each row and each column of the first parameter matrices are both 1;

if the preset bits are 10, the quantities of the target parameters in each row and each column of the first parameter matrices are both 2; and if the preset bits are 11, the quantities of the target parameters in each row and each column of the first parameter matrices are both 3.

As an optional implementation, the first parameter matrix includes a plurality of first sub-matrices, and the first parameter matrix is obtained by rotating one of the first sub-matrices anticlockwise or clockwise.

As an optional implementation, if a plurality of frames of to-be-displayed images are obtained in a preset cycle, in the pixel values of adjacent frames of to-be-displayed images, ones of the first sub-matrices in the first parameter matrices corresponding to same preset bits are different; and the preset bits are determined according to a difference between a total quantity of bits of the pixel values of the to-be-displayed images and a total quantity of bits of pixel values that the display screen is able to display.

As an optional implementation, distribution of the plurality of first sub-matrices of the first parameter matrix is determined according to preset bits of the pixel values in the to-be-displayed image, and positional relationships determined by different preset bits are different.

As an optional implementation, when the preset bits are last two bits of the pixel values in the to-be-displayed image, the processor 1101 is configured to determine the distribution of the plurality of first sub-matrices of the first parameter matrix as follows:

if the preset bits are 01, the first sub-matrix located at an upper left corner of the first parameter matrix is fixed, and other first sub-matrices are obtained by rotating the first sub-matrix at the upper left corners anticlockwise or clockwise;

if the preset bits are 10, the first sub-matrices on diagonals of the first parameter matrix are distributed symmetrically; and if the preset bits are 11, the first sub-matrices on the diagonals of the first parameter matrix are same.

As an optional implementation, the first dither algorithm includes a set of first parameter matrices, the set of first parameter matrices includes a plurality of first parameter matrix groups, and each of the first parameter matrix groups includes a plurality of first parameter matrices;

where the set of first parameter matrices corresponds to a plurality of frames of to-be-displayed images obtained in a preset cycle, and each of the first parameter matrix groups corresponds to one frame of to-be-displayed image obtained.

As an optional implementation, the second dither algorithm includes a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

As an optional implementation, the target parameters in the second parameter matrices are distributed symmetrically.

As an optional implementation, when last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix; where the first candidate parameter matrix is a first parameter matrix corresponding to a pixel value with the last two bits being 01 in the first region, among a plurality of first parameter matrices in the first dither algorithm; or, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix; where the second candidate parameter matrix is a first parameter matrix corresponding to a pixel value with the last two bits being 10 in the first region, among the plurality of first parameter matrices in the first dither algorithm.

As an optional implementation, when last two bits of the pixel value in the second region of the to-be-displayed image are 11, the second parameter matrix is same as a third candidate parameter matrix;

where the third candidate parameter matrix is a first parameter matrix corresponding to a pixel value with the last two bits being 11 in the first region, among the plurality of first parameter matrices in the first dither algorithm.

As an optional implementation, if a plurality of frames of to-be-displayed images are obtained in a preset cycle, in the pixel values of adjacent frames of to-be-displayed images, same preset bits correspond to a same second parameter matrix.

As an optional implementation, a size of the second parameter matrices is determined according to a size of first parameter matrices; or, the size of the second parameter matrices is determined according to a correspondence relationship between pixels of the to-be-displayed image and pixels of a non-fixation region of the display screen.

As an optional implementation, the second dither algorithm includes a set of second parameter matrices, the set of second parameter matrices includes a plurality of second parameter matrix groups, and each of the second parameter matrix groups includes a plurality of second parameter matrices;

where the set of second parameter matrices corresponds to a plurality of frames of to-be-displayed images obtained in a preset cycle, and each of the second parameter matrix groups corresponds to one frame of to-be-displayed image obtained.

As an optional implementation, the processor 1101 is configured to perform:

splitting the to-be-displayed image into a plurality of sub-images, each of the sub-images being a single-channel image;

determining first regions of the respective sub-images according to the first region of the to-be-displayed image, and determining second regions of the respective sub-images according to the second region of the to-be-displayed image;

for each of the sub-images, obtaining a rendered sub-image corresponding to the sub-image by rendering the first region of the sub-image according to the first dither algorithm and rendering the second region of the sub-image according to the second dither algorithm; and obtaining the rendered image by combining rendered sub-images corresponding to the sub-images.

As an optional implementation, the first dither algorithm includes first parameter matrices, and the second dither algorithm includes second parameter matrices; and the processor 1101 is configured to perform:

determining the first parameter matrices for traversing the first region according to pixel values of pixels of the first region; and rendering the pixel values in the first region according to parameters corresponding to pixel positions of the pixels and the pixel values of the pixels in the first parameter matrices during traversing; or, determining the second parameter matrices for traversing the second region according to pixel values of pixels of the second region; and rendering the pixel values in the second region according to parameters corresponding to pixel positions of the pixels and the pixel values of the pixels in the second parameter matrices during traversing.

Embodiment 3 is as follows. Based on the same inventive concept, an embodiment of the present disclosure further provides an image processing apparatus based on a dither algorithm. Since the apparatus is an apparatus in the method in embodiments of the present disclosure and the principle of solving problems of the apparatus is similar to that of the method, implementation of the apparatus may refer to implementation of the method, and repetitions are omitted.

Figure 12:
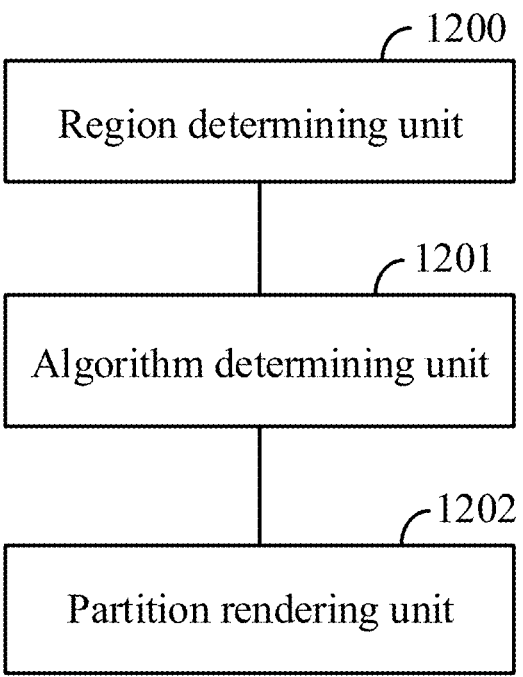
FIG. 12 is a schematic diagram of an image processing apparatus based on a dither algorithm according to an embodiment of the present disclosure.

As shown in FIG. 12, the apparatus includes:

a region determining unit 1200, configured to obtain a to-be-displayed image, and determine a first region and a second region of the to-be-displayed image, where the first region and the second region are determined according to a coverage range of a visual field of a user on a display screen;

an algorithm determining unit 1201, configured to determine a first dither algorithm corresponding to the first region and a second dither algorithm corresponding to the second region, where parameter matrices of the first dither algorithm and the second dither algorithm are different; and a partition rendering unit 1202, configured to obtain a rendered image of the to-be-displayed image by rendering the first region according to the first dither algorithm and rendering the second region according to the second dither algorithm, and display the rendered image on the display screen.

As an optional implementation, the region determining unit 1200 is configured to:

determine a fixation region and a non-fixation region on the display screen according to a coverage range of a central fovea visual field of the user on the display screen;

determine the first region according to the fixation region, the to-be-displayed image and a resolution of the display screen, where one pixel of the first region corresponds to one pixel of the fixation region; and determine the second region according to the non-fixation region, the to-be-displayed image and the resolution of the display screen, where one pixel of the second region corresponds to a plurality of pixels of the non-fixation region.

As an optional implementation, the first dither algorithm includes a plurality of first parameter matrices; the plurality of first parameter matrices are used for processing different pixel values in the first region of the to-be-displayed image; and target parameters in the first parameter matrices are distributed symmetrically.

As an optional implementation, if a plurality of frames of to-be-displayed images are obtained in a preset cycle, in adjacent frames of to-be-displayed images, the target parameters in the first parameter matrices corresponding to pixel values at a same pixel position are same in quantity and different in position;

where the preset cycle is determined according to a quantity of frames of successively-obtained to-be-displayed images.

As an optional implementation, the target parameters in the first parameter matrices are 1, and the target parameters are distributed symmetrically along diagonals of the first parameter matrices.

As an optional implementation, a quantity of the target parameters in the first parameter matrices is determined according to preset bits of the pixel values in the to-be-displayed image, and different preset bits correspond to different quantities of target parameters; and the preset bits are determined according to a difference between a total quantity of bits of the pixel values of the to-be-displayed images and a total quantity of bits of pixel values that the display screen is able to display.

As an optional implementation, when the preset bits are last two bits of the pixel values in the to-be-displayed image and the target parameters are 1, the algorithm determining unit 1201 is configured to determine the quantity of the target parameters in the first parameter matrices as follows:

if the preset bits are 00, the quantity of the target parameters in the first parameter matrices is 0;

if the preset bits are 01, the quantities of the target parameters in each row and each column of the first parameter matrices are both 1;

if the preset bits are 10, the quantities of the target parameters in each row and each column of the first parameter matrices are both 2; and if the preset bits are 11, the quantities of the target parameters in each row and each column of the first parameter matrices are both 3.

As an optional implementation, the first parameter matrix includes a plurality of first sub-matrices, and the first parameter matrix is obtained by rotating one of the first sub-matrices anticlockwise or clockwise.

As an optional implementation, if a plurality of frames of to-be-displayed images are obtained in a preset cycle, in the pixel values of adjacent frames of to-be-displayed images, ones of the first sub-matrices in the first parameter matrices corresponding to same preset bits are different; and the preset bits are determined according to a difference between a total quantity of bits of the pixel values of the to-be-displayed images and a total quantity of bits of pixel values that the display screen is able to display.

As an optional implementation, distribution of the plurality of first sub-matrices of the first parameter matrix is determined according to preset bits of the pixel values in the to-be-displayed image, and positional relationships determined by different preset bits are different.

As an optional implementation, when the preset bits are last two bits of the pixel values in the to-be-displayed image, the algorithm determining unit 1201 is configured to determine the distribution of the plurality of first sub-matrices of the first parameter matrix as follows:

if the preset bits are 01, the first sub-matrix located at an upper left corner of the first parameter matrix is fixed, and other first sub-matrices are obtained by rotating the first sub-matrix at the upper left corner anticlockwise or clockwise;

if the preset bits are 10, the first sub-matrices on diagonals of the first parameter matrix are distributed symmetrically; and if the preset bits are 11, the first sub-matrices on the diagonals of the first parameter matrix are same.

As an optional implementation, the first dither algorithm includes a set of first parameter matrices, the set of first parameter matrices includes a plurality of first parameter matrix groups, and each of the first parameter matrix groups includes a plurality of first parameter matrices;

where the set of first parameter matrices corresponds to a plurality of frames of to-be-displayed images obtained in a preset cycle, and each of the first parameter matrix groups corresponds to one frame of to-be-displayed image obtained.

As an optional implementation, the second dither algorithm includes a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

As an optional implementation, the target parameters in the second parameter matrices are distributed symmetrically.

As an optional implementation, when last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix; where the first candidate parameter matrix is a first parameter matrix corresponding to a pixel value with the last two bits being 01 in the first region, among a plurality of first parameter matrices in the first dither algorithm; or, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix; where the second candidate parameter matrix is a first parameter matrix corresponding to a pixel value with the last two bits being 10 in the first region, among the plurality of first parameter matrices in the first dither algorithm.

As an optional implementation, when last two bits of the pixel value in the second region of the to-be-displayed image are 11, the second parameter matrix is same as a third candidate parameter matrix;

where the third candidate parameter matrix is a first parameter matrix corresponding to a pixel value with the last two bits being 11 in the first region, among the plurality of first parameter matrices in the first dither algorithm.

As an optional implementation, if a plurality of frames of to-be-displayed images are obtained in a preset cycle, in the pixel values of adjacent frames of to-be-displayed images, same preset bits correspond to a same second parameter matrix.

As an optional implementation, a size of the second parameter matrices is determined according to a size of first parameter matrices; or, the size of the second parameter matrices is determined according to a correspondence relationship between pixels of the to-be-displayed image and pixels of a non-fixation region of the display screen.

As an optional implementation, the second dither algorithm includes a set of second parameter matrices, the set of second parameter matrices includes a plurality of second parameter matrix groups, and each of the second parameter matrix groups includes a plurality of second parameter matrices;

where the set of second parameter matrices corresponds to a plurality of frames of to-be-displayed images obtained in a preset cycle, and each of the second parameter matrix groups corresponds to one frame of to-be-displayed image obtained.

As an optional implementation, the partition rendering unit 1202 is configured to:

split the to-be-displayed image into a plurality of sub-images, each of the sub-images being a single-channel image;

determine first regions of the respective sub-images according to the first region of the to-be-displayed image, and determine second regions of the respective sub-images according to the second region of the to-be-displayed image;

for each of the sub-images, obtain a rendered sub-image corresponding to the sub-image by rendering the first region of the sub-image according to the first dither algorithm and rendering the second region of the sub-image according to the second dither algorithm; and obtain the rendered image by combining rendered sub-images corresponding to the sub-images.

As an optional implementation, the first dither algorithm includes first parameter matrices, and the second dither algorithm includes second parameter matrices; and the partition rendering unit 1202 is configured to:

determine the first parameter matrices for traversing the first region according to pixel values of pixels of the first region; and render the pixel values in the first region according to parameters corresponding to pixel positions of the pixels and the pixel values of the pixels in the first parameter matrices during traversing; or, determine the second parameter matrices for traversing the second region according to pixel values of pixels of the second region; and render the pixel values in the second region according to parameters corresponding to pixel positions of the pixels and the pixel values of the pixels in the second parameter matrices during traversing.

Based on the same inventive concept, an embodiment of the present disclosure further provides a computer storage medium, storing a computer program thereon, and the program, when executed by a processor, implements following steps:

obtaining a to-be-displayed image, and determining a first region and a second region of the to-be-displayed image, where the first region and the second region are determined according to a coverage range of a visual field of a user on a display screen;

determining a first dither algorithm corresponding to the first region and a second dither algorithm corresponding to the second region, where parameter matrices of the first dither algorithm and the second dither algorithm are different; and obtaining a rendered image of the to-be-displayed image by rendering the first region according to the first dither algorithm and rendering the second region according to the second dither algorithm, and displaying the rendered image on the display screen.

Those skilled in the art will appreciate that embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including, but not limited to, a disk memory, an optical memory and the like) containing computer available program codes.

The present disclosure is described with reference to the flow diagrams and/or block diagrams of the method, device (system), and computer program product according to embodiments of the present disclosure. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate a device for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction device, and the instruction device implements the functions specified in one or more flows of the flow diagram and/or one or more blocks of the block diagram.

These computer program instructions can also be loaded onto a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

Apparently, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. An image processing method based on a dither algorithm, comprising:

obtaining a to-be-displayed image, and determining a first region and a second region of the to-be-displayed image, wherein the first region and the second region are determined according to a coverage range of a visual field of a user on a display screen;

determining a first dither algorithm corresponding to the first region and a second dither algorithm corresponding to the second region, wherein parameter matrices of the first dither algorithm and the second dither algorithm are different; and obtaining a rendered image of the to-be-displayed image by rendering the first region according to the first dither algorithm and rendering the second region according to the second dither algorithm, and displaying the rendered image on the display screen;

wherein the first dither algorithm comprises a plurality of first parameter matrices; the plurality of first parameter matrices are used for processing different pixel values in the first region of the to-be-displayed image; and target parameters in the first parameter matrices are distributed symmetrically;

wherein the first parameter matrix comprises a plurality of first sub-matrices, and the first parameter matrix is obtained by rotating one of the first sub-matrices anti-clockwise or clockwise.

2. The method according to claim 1, wherein the determining the first region and the second region of the to-be-displayed image comprises:

determining a fixation region and a non-fixation region on the display screen according to a coverage range of a central fovea visual field of the user on the display screen;

determining the first region according to the fixation region, the to-be-displayed image and a resolution of the display screen, wherein one pixel of the first region corresponds to one pixel of the fixation region; and determining the second region according to the non-fixation region, the to-be-displayed image and the resolution of the display screen, wherein one pixel of the second region corresponds to a plurality of pixels of the non-fixation region.

3. The method according to claim 1, wherein in a case that a plurality of frames of to-be-displayed images are obtained in a preset cycle, in adjacent frames of to-be-displayed images, the target parameters in the first parameter matrices corresponding to pixel values at a same pixel position are same in quantity and different in position;

wherein the preset cycle is determined according to a quantity of frames of successively-obtained to-be-displayed images.

4. The method according to claim 1, wherein the target parameters in the first parameter matrices are 1, and the target parameters are distributed symmetrically along diagonals of the first parameter matrices.

5. The method according to claim 1, wherein a quantity of the target parameters in the first parameter matrices is determined according to preset bits of the pixel values in the to-be-displayed image, and different preset bits correspond to different quantities of target parameters; and the preset bits are determined according to a difference between a total quantity of bits of the pixel values of the to-be-displayed images and a total quantity of bits of pixel values that the display screen is able to display;

wherein when the preset bits are last two bits of the pixel values in the to-be-displayed image and the target parameters are 1, the quantity of the target parameters in the first parameter matrices is determined as follows:

in a case that the preset bits are 00, the quantity of the target parameters in the first parameter matrices is 0;

in a case that the preset bits are 01, the quantities of the target parameters in each row and each column of the first parameter matrices are both 1;

in a case that the preset bits are 10, the quantities of the target parameters in each row and each column of the first parameter matrices are both 2; and in a case that the preset bits are 11, the quantities of the target parameters in each row and each column of the first parameter matrices are both 3.

6. The method according to claim 1, wherein in a case that a plurality of frames of to-be-displayed images are obtained in a preset cycle, in the pixel values of adjacent frames of to-be-displayed images, ones of the first sub-matrices in the first parameter matrices corresponding to same preset bits are different; and the preset bits are determined according to a difference between a total quantity of bits of the pixel values of the to-be-displayed images and a total quantity of bits of pixel values that the display screen is able to display.

7. The method according to claim 1, wherein distribution of the plurality of first sub-matrices of the first parameter matrix is determined according to preset bits of the pixel values in the to-be-displayed image, and positional relationships determined by different preset bits are different;

wherein when the preset bits are last two bits of the pixel values in the to-be-displayed image, the distribution of the plurality of first sub-matrices of the first parameter matrix is determined as follows:

in a case that the preset bits are 01, the first sub-matrix located at an upper left corner of the first parameter matrix is fixed, and other first sub-matrices are obtained by rotating the first sub-matrix at the upper left corner anticlockwise or clockwise;

in a case that the preset bits are 10, the first sub-matrices on diagonals of the first parameter matrix are distributed symmetrically; and in a case that the preset bits are 11, the first sub-matrices on the diagonals of the first parameter matrix are same.

8. The method according to claim 1, wherein the first dither algorithm comprises a set of first parameter matrices, the set of first parameter matrices comprises a plurality of first parameter matrix groups, and each of the first parameter matrix groups comprises a plurality of first parameter matrices;

wherein the set of first parameter matrices corresponds to a plurality of frames of to-be-displayed images obtained in a preset cycle, and each of the first parameter matrix groups corresponds to one frame of to-be-displayed image obtained.

9. The method according to claim 1, wherein the second dither algorithm comprises a plurality of second parameter matrices; the plurality of second parameter matrices are used for processing different pixel values in the second region of the to-be-displayed image; and a quantity of target parameters in the second parameter matrices is determined according to preset bits of the pixel values in the to-be-displayed image, and different preset bits correspond to different quantities of target parameters.

10. The method according to claim 9, wherein the target parameters in the second parameter matrices are distributed symmetrically.

11. The method according to claim 9, wherein when last two bits of the pixel value in the second region of the to-be-displayed image are 01, the target parameters in the second parameter matrix are not adjacent, and the quantity of the target parameters in the second parameter matrix is less than a quantity of target parameters in a first candidate parameter matrix; wherein the first candidate parameter matrix is a first parameter matrix corresponding to a pixel value with the last two bits being 01 in the first region, among a plurality of first parameter matrices in the first dither algorithm; or, when the last two bits of the pixel value in the second region of the to-be-displayed image are 10, the target parameters in the second parameter matrix are not adjacent, and the quantity of the target parameters in the second parameter matrix is less than a quantity of target parameters in a second candidate parameter matrix; wherein the second candidate parameter matrix is a first parameter matrix corresponding to a pixel value with the last two bits being 10 in the first region, among the plurality of first parameter matrices in the first dither algorithm.

12. The method according to claim 9, wherein when last two bits of the pixel value in the second region of the to-be-displayed image are 11, the second parameter matrix is same as a third candidate parameter matrix;

wherein the third candidate parameter matrix is a first parameter matrix corresponding to a pixel value with the last two bits being 11 in the first region, among a plurality of first parameter matrices in the first dither algorithm.

13. The method according to claim 9, wherein in a case that a plurality of frames of to-be-displayed images are obtained in a preset cycle, in the pixel values of adjacent frames of to-be-displayed images, same preset bits correspond to a same second parameter matrix.

14. The method according to claim 9, wherein a size of the second parameter matrices is determined according to a size of first parameter matrices; or, the size of the second parameter matrices is determined according to a correspondence relationship between pixels of the to-be-displayed image and pixels of a non-fixation region of the display screen.

15. The method according to claim 9, wherein the second dither algorithm comprises a set of second parameter matrices, the set of second parameter matrices comprises a plurality of second parameter matrix groups, and each of the second parameter matrix groups comprises a plurality of second parameter matrices;

wherein the set of second parameter matrices corresponds to a plurality of frames of to-be-displayed images obtained in a preset cycle, and each of the second parameter matrix groups corresponds to one frame of to-be-displayed image obtained.

16. The method according to claim 1, wherein the obtaining the rendered image of the to-be-displayed image by rendering the first region according to the first dither algorithm and rendering the second region according to the second dither algorithm comprises:

splitting the to-be-displayed image into a plurality of sub-images, each of the sub-images being a single-channel image;

determining first regions of the respective sub-images according to the first region of the to-be-displayed image, and determining second regions of the respective sub-images according to the second region of the to-be-displayed image;

for each of the sub-images, obtaining a rendered sub-image corresponding to the sub-image by rendering the first region of the sub-image according to the first dither algorithm and rendering the second region of the sub-image according to the second dither algorithm; and obtaining the rendered image by combining rendered sub-images corresponding to the sub-images.

17. The method according to claim 1, wherein the second dither algorithm comprises second parameter matrices; and the rendering the first region according to the first dither algorithm and rendering the second region according to the second dither algorithm comprises:

determining the first parameter matrices for traversing the first region according to pixel values of pixels of the first region; and rendering the pixel values in the first region according to parameters corresponding to pixel positions of the pixels and the pixel values of the pixels in the first parameter matrices during traversing; or, determining the second parameter matrices for traversing the second region according to pixel values of pixels of the second region; and rendering the pixel values in the second region according to parameters corresponding to pixel positions of the pixels and the pixel values of the pixels in the second parameter matrices during traversing.

18. A display device, comprising a display screen and a processor, wherein:

the display screen is configured to display contents; and the processor is configured to perform steps of the method according to claim 1.

* * * * *